(12) United States Patent
Yin et al.

(10) Patent No.: US 10,999,606 B2
(45) Date of Patent: May 4, 2021

(54) METHOD AND SYSTEM OF NEURAL NETWORK LOOP FILTERING FOR VIDEO CODING

(71) Applicant: Intel Corporation, Santa Clara, CA (US)

(72) Inventors: Hujun Yin, Saratoga, CA (US); Shoujiang Ma, Shanghai (CN); Xiaoran Fang, Shanghai (CN); Rongzhen Yang, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/418,803

(22) Filed: May 21, 2019

(65) Prior Publication Data

US 2019/0273948 A1    Sep. 5, 2019

Related U.S. Application Data

(60) Provisional application No. 62/789,952, filed on Jan. 8, 2019.

(51) Int. Cl.
| | |
|---|---|
| *H04N 19/00* | (2014.01) |
| *H04N 19/82* | (2014.01) |
| *G06N 3/04* | (2006.01) |
| *H04N 19/172* | (2014.01) |
| *H04N 19/117* | (2014.01) |
| *H04N 19/70* | (2014.01) |

(52) U.S. Cl.
CPC ............ *H04N 19/82* (2014.11); *G06N 3/0454* (2013.01); *H04N 19/117* (2014.11); *H04N 19/172* (2014.11); *H04N 19/70* (2014.11)

(58) Field of Classification Search
CPC ...... H04N 19/172; H04N 19/70; H04N 19/82; H04N 19/117; H04N 19/176; G06N 3/0481; G06N 3/08; G06N 3/0454
See application file for complete search history.

(56) References Cited

U.S. PATENT DOCUMENTS

| | | | |
|---|---|---|---|
| 9,968,257 B1* | 5/2018 | Burt ..................... | A61B 5/7267 |
| 2018/0025257 A1* | 1/2018 | van den Oord ...... | G06K 9/4652 |
| | | | 375/240.14 |
| 2019/0079915 A1* | 3/2019 | Min ....................... | G06F 40/20 |
| 2019/0289327 A1* | 9/2019 | Lin ......................... | H04N 19/82 |
| 2020/0099954 A1* | 3/2020 | Hemmer ................. | G06T 9/004 |
| 2020/0111238 A1* | 4/2020 | Covell ................. | G06N 3/0445 |
| 2020/0133449 A1* | 4/2020 | Davies .................. | G06N 3/088 |
| 2020/0143205 A1* | 5/2020 | Yao ..................... | G06K 9/6262 |
| 2020/0160972 A1* | 5/2020 | Beriault ................. | G16H 30/40 |
| 2020/0167972 A1* | 5/2020 | Birnhack ................ | G06N 3/08 |

OTHER PUBLICATIONS

Boyce, J. et al., "JVET common test conditions and evaluation procedures for 360 video", JVET-F1030, 6th Meeting, Hobart, AU, Mar. 31-Apr. 7, 2017.

(Continued)

*Primary Examiner* — Zhihan Zhou
(74) *Attorney, Agent, or Firm* — Green, Howard & Mughal LLP.

(57) ABSTRACT

A method, system, medium, and article provide neural network loop filtering for video coding with multiple alternative neural networks.

25 Claims, 11 Drawing Sheets

(56) References Cited

OTHER PUBLICATIONS

Boyce, J. et al., "JVET common test conditions and software reference configuration", JVET-J1010, 10th Meeting, San Diego, CA, USA, Apr. 10-20, 2018.
Hashimoto, T. et al., "AHG9: Separable convolutional neural network filter with squeez and excitation block", JVET-K0158, Sharp Corporation, 11th Meeting, Ljubljana, SI Jul. 10-18, 2018.
Hsiao, Y.L. et al., "AHG9: Convolutional neural network loop filter", JVET-K0222, Media Tek Inc., 11th Meeting, Ljubljana, SI, Jul. 10-18, 2018.
Kawamura, K. et al., "AHG9: Convolutional neural network filter", JVET L0383, KDDI Corp., 12th Meeting, Macao, CN, Oct. 3-12, 2018.
Li, Y. et al., "Methodology and reporting template for neural network coding tool testing", JVET-L1006, 12th Meeting, Macao, CN, Oct. 3-12, 2018.
Nayar, et al., "High dynamic range imaging: spatially varying pixel exposures", Proceedings of IEEE Conference on Computer Vision and Pattern Recognition, (CVPR 2000), Jun. 15, 2000.
Wang, Y. et al., "AHG9: Dense residual convolutional neural network based in-loop filter", JVET-L0242, 12th Meeting, Macao, CN, Oct. 3-12, 2018.
Yin, et al., "AHG9: Adaptive convolutional neural network loop filter", JVET-M0566, Intel Corporation, 13th Meeting, Marrakesh, Jan. 2019.
Zhang, K. et al., "CE2: Summary report on in-loop filters", JVET-K0022, CE2 Coordinators, 11th Meeting, Ljubljana, SI, Jul. 10-18, 2018.

\* cited by examiner

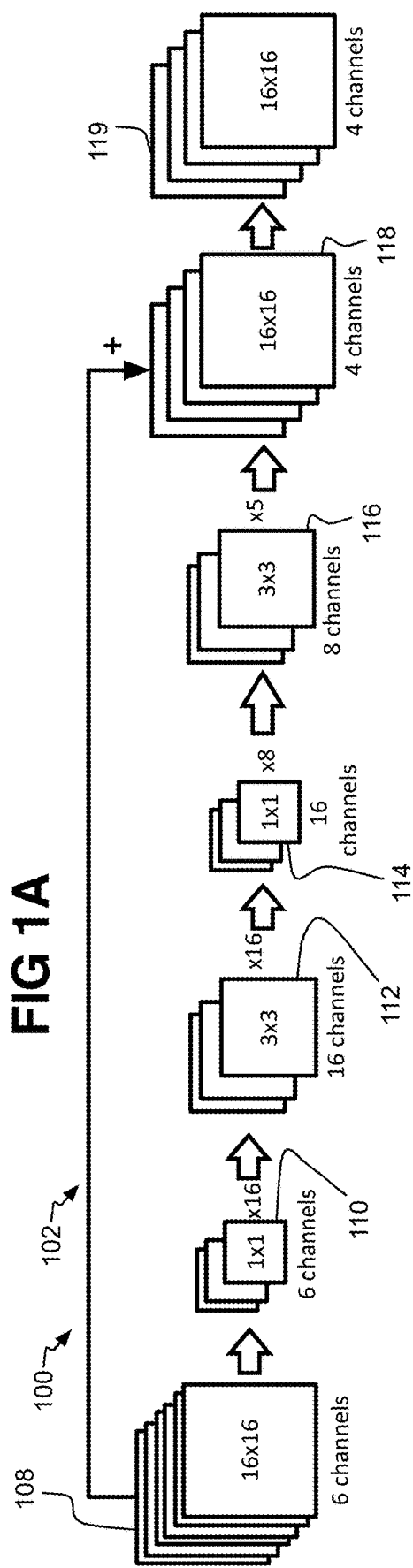
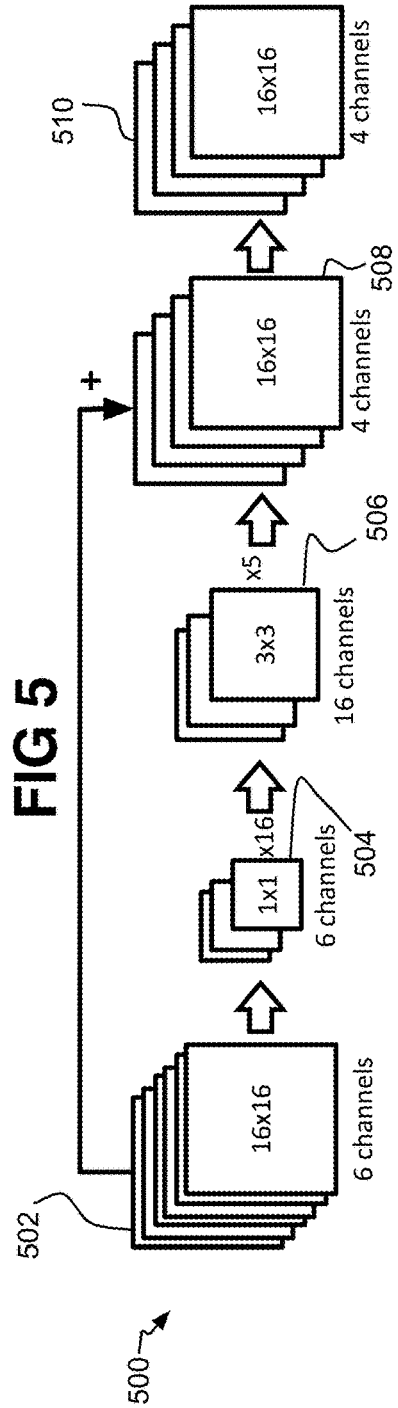
FIG 1A
FIG 5

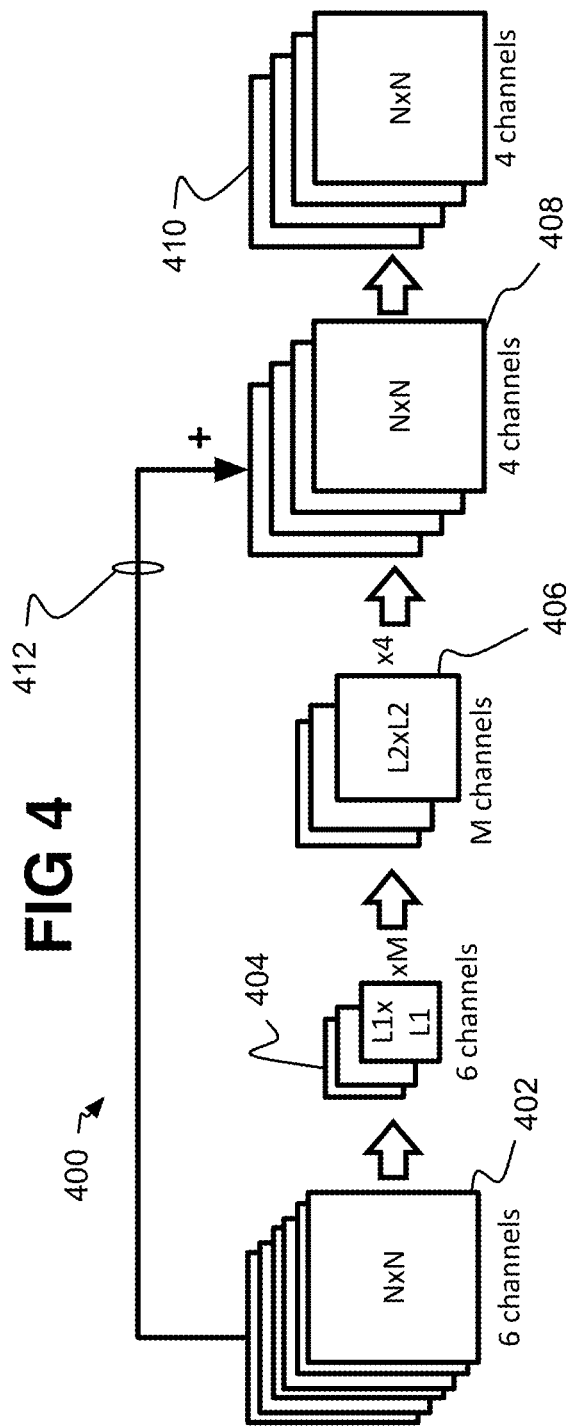

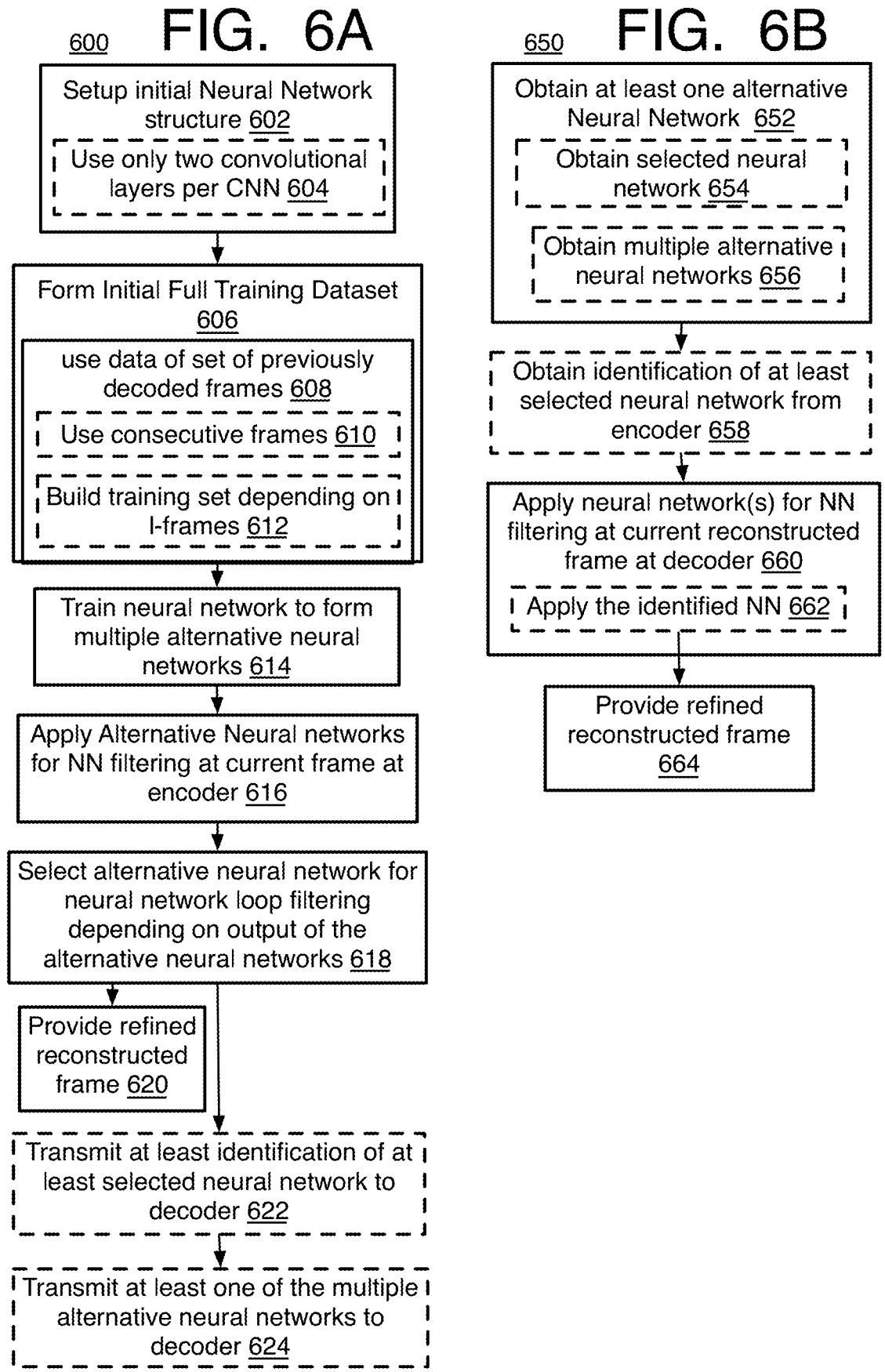

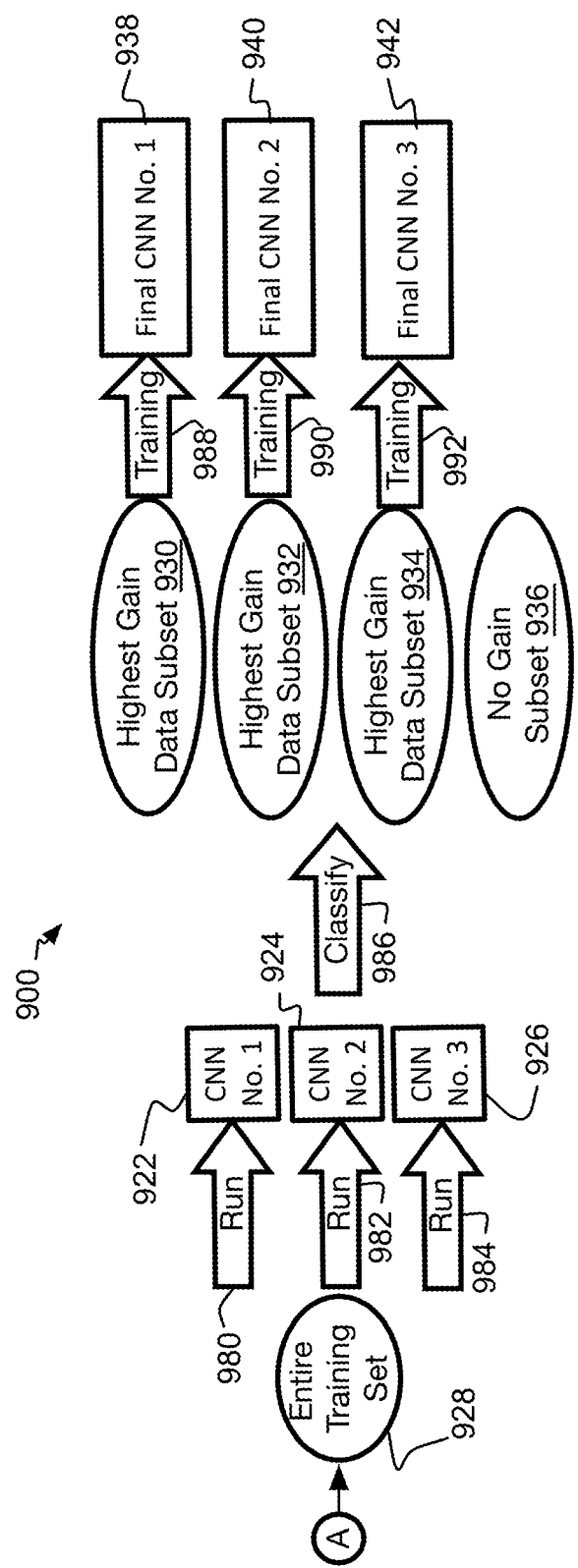

METHOD AND SYSTEM OF NEURAL NETWORK LOOP FILTERING FOR VIDEO CODING

CLAIM OF PRIORITY

This application claims priority to U.S. Provisional Patent Application Ser. No. 62/789,952, filed on Jan. 8, 2019 and titled "METHOD AND SYSTEM OF NEURAL NETWORK LOOP FILTERING FOR VIDEO CODING", which is incorporated by reference in its entirety.

BACKGROUND

Video coding (CODEC) is used to compress, transmit, and decompress video data for viewing images at a remote video display device. Encoders that compress the data often use a decoding loop that reconstructions or decodes the compressed data to determine differences between the reconstructed data and the original video which are referred to as residuals. These residuals then may be sent to a remote decoder for accurate reconstruction of the video at the decoder. Loop (or in-loop) filters at the decoding loop of an encoder are commonly used in the video coding to improve the quality (both objective and subjective) of reconstructed video. The loop filters are used at the decoder as well. The loop filters are typically applied at the end of a frame reconstruction process and include a de-blocking Filter (DBF), sample adaptive offset (SAO) filter, and adaptive loop filter (ALF) addressing different aspects of video reconstruction artifacts to improve the final quality of reconstructed video. The filters can be linear or non-linear, and fixed or adaptive. Multiple filters may be used alone or together.

In addition to these three filters, convolutional neural networks (CNNs) are used as a nonlinear loop filter to substantially improve the quality of reconstructed video or video coding efficiency. In this case, a CNN is applied as one in-loop filter stage referred to as a convolutional neural network loop filter (CNNLF). The input to a CNNLF can include three kinds of data: reconstructed samples, prediction samples, and/or residual samples. The reconstructed samples are ALF output samples; the prediction samples are inter or intra prediction samples; and the residual samples are samples obtained after inverse quantization and inverse transform. The output of a CNNLF is the refined and restored reconstructed samples.

Difficulties arise with the conventional CNNLF, however, because the operation of the conventional CNNLF usually requires a very large number of parameters creating an overly complex neural network that increases decoding complexity and the computational load, and in turn, the size and cost of the decoder hardware, power consumption, and memory requirements. This also increases processing delay resulting in lower performance.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 1A is another schematic diagram of the conventional neural network of FIG. 1;

FIG. 4 is a schematic flow diagram of a neural network according to at least one of the implementations herein;

FIG. 5 is another schematic flow diagram of a neural network according to at least one of the implementations herein;

FIG. 6A is a detailed flow chart of a method of neural network loop filtering for video coding at an encoder according to at least one of the implementations herein;

FIG. 6B is a detailed flow chart of a method of neural network loop filtering for video coding at a decoder according to at least one of the implementations herein;

FIGS. 9A-9B is a schematic flow diagram of a process of training multiple neural networks for a method of neural network loop filtering for video coding according to at least one of the implementations herein;

DETAILED DESCRIPTION

Figure 1:
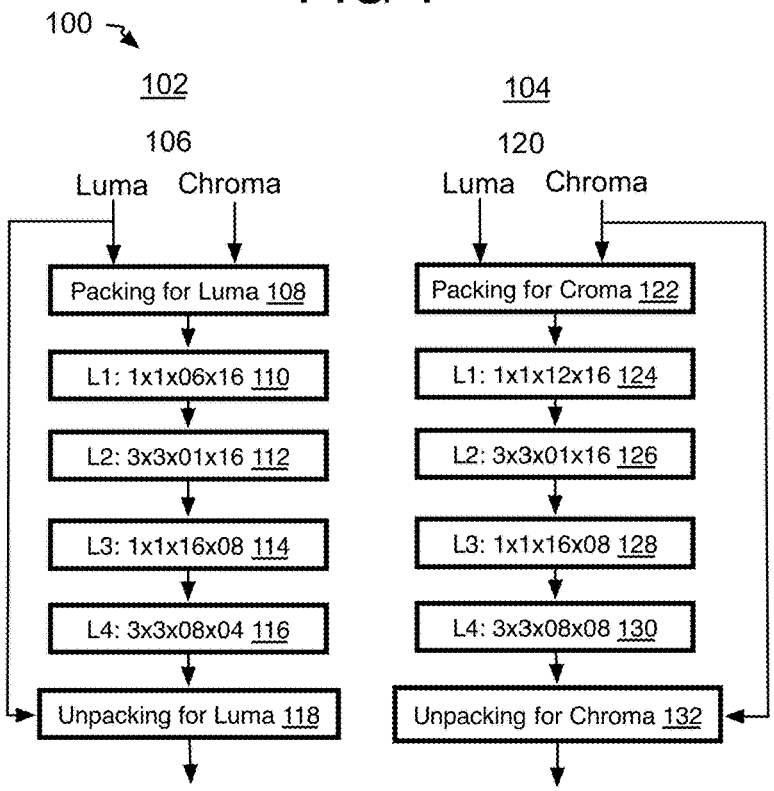
FIG. 1 is a schematic diagram of a conventional loop filtering neural network used for video coding.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specified herein. For instance, various architectures employing, for example, multiple integrated circuit (IC) chips and/or packages, and/or various computing devices and/or consumer electronic (CE) devices such as set top boxes, smart phones, tablets, televisions, etc., may implement the techniques and/or arrangements described herein. The neural networks mentioned herein may or may not be operated by specific-function hardware such as graphics processing units (GPUs), image signal processors (ISPs), and so forth. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods are described below related to neural network loop filtering for video coding.

The Joint Video Experts Team (JVET) associated with the international telecommunication union (ITU) has developed a versatile video coding (VVC) standard to improve compression performance. In current VVC test model (VTM) software, multiple in-loop filters such as deblocking filter (DBF), sample adaptive offset (SAO) filter, and adaptive loop filter (ALF) are applied at one of the last stages of a decoding process to improve the quality of reconstructed frames. The DBF smooths block edges to remove visible blockiness that might be introduced while coding. The SAO filter provides offsets to add to pixel values in order to adjust incorrect intensity shifts. The ALF uses one or more sets or patterns of filter coefficients that when applied to decoded pixels of reconstructed reference frames, slices, and/or blocks results in modified image data that is much closer to the corresponding pixels of the original frame, slice, and/or block data, thereby providing a more accurate, higher quality decoded frame. This may be performed by using Weiner-based adaptive filters or other types of filters to minimize the mean square error between original samples and decoded samples. These filters are used on both the decoding loop of the encoder as well as at a decoder.

As mentioned, a convolutional neural network loop filter (CNNLF) is another type of in-loop filter that utilizes convolutional neural networks (CNNs) that further refines the image data and removes compression artifacts. A CNNLF has demonstrated promising performance benefits. See Hsiao, Y. L. et al., "AHG9: Convolutional neural network loop filter," JVET-K0222, Media Tek Inc., 2018; Wang, Y. et al., "AHG9: Dense residual convolutional neural network based in-loop filter," JVET-L0242, Wuhan University, Tencent, 2018; Hashimoto, T et al., "AHG9: Separable convolutional neural network filter with squeeze and excitation block," JVET-K0158, Sharp Corporation, 2018; and Kawamura, K et al., "AHG9: Convolutional neural network filter," JVET L0383, KDDI Corp., 2018.

Referring to FIGS. 1 and 1A, the conventional CNNLF by Hsiao, Y. L. et al., cited above, uses a four-layer CNNLF 100 and provides both luma and chroma filtration with luma and chroma neural networks (NNs) 102 and 104 respectively. In this arrangement, the syntax of CNNLF parameters are located in an intra-slice (I-slice) header. The luma NN filter or neural network structure 102 receives both luma and chroma data 106 and packs the data to form a six channel 16×16 input 108 including blocks of both luma and chroma data. The input 106 is received by a four layer NN including layers L1 to L4 (110 to 116 numbered evenly). The input 108 is first provided to a six channel 1×1 convolutional hidden layer L1 104 that outputs 16 channels, then a 16 channel 3×3 convolutional hidden layer L2 112 that also outputs 16 channels, next a 16 channel 1×1 convolutional hidden layer L3 114 that outputs eight channels, and an eight channel 3×3 convolutional hidden layer L4 116 that outputs four channels. This resulting data output from the last layer is in the form of luma values that are placed in four 16×16 channels by an unpacking layer 118 thereby providing four channel 16×16 output 119 (FIG. 1A) of luma values to form a final reconstructed frame.

The conventional structure 100 also has the chroma neural network 104 that receives both luma and chroma input 120. This chroma NN 104 has similar packing and unpacking operations 122 and 132, as well as layers L1 to L4, here numbered evenly 124 to 130, compared to the luma NN 102. Here, however, layer L1 124 receives the input data in 12 channels instead of 6 channels to perform the 1×1 filtering and that forms 16 output channels. The 12 channels provide smaller 8×8 blocks (8 luma Y blocks and 2 each of U and V chroma blocks) of data.

Relevant here for the conventional CNNLF 100, only reconstructed samples are used as input to the CNNLF. Frames with a temporal ID equal to 0 or 1, which refers to the frame location in a group of frames (GOP), are the only frames used for training. The temporal ID is the cross-referencing layer that is defined in video codec standards (H.263, H.264, H.265, and H.266 for example). Thus, 0 layer is I-frames, while the 1 layer is P-frames between the I-frames.

However, these frames used for training are required to be processed twice which can cause delay in the filtering such that real-time filtering cannot be used. Specifically, in a first or training stage, the frames are first encoded when the video coding system generates data required for the CNNLF training process and derives CNNLF parameters. In a second or inference stage, the frames are encoded again when the system uses original image data again to generate a final bitstream but now while performing CNNLF with the parameters derived from the training.

The number of parameters for this CNNLF 100 in Hsiao, Y. L. et al. is considered a reduction (four layers, 2860 parameters including 2816 weights plus 44 bias values) compared to prior techniques. This is accomplished by adaptively training CNN with video data to be compressed itself (or in other words, online training) because video content is often similar from frame to frame so that relevant features in a video can be captured with a smaller number of parameters. However, a four-layer CNNLF is still quite complex compared to an ALF filter. Thus, despite the substantially reduced size of a CNN network (from 8 layers to 4 layers), it still has the relatively large number of 2,860 parameters. This impacts the CODEC, and in particular the decoder complexity. This CNNLF also requires a large amount of training data to achieve good performance. Therefore, it is inherently memory and computing intensive, and may lead to substantially higher codec complexity resulting in a larger amount and cost of hardware and memory, and/or computational delays and lower performance.

Also in the Hsiao, Y. L. et al. training process, since in one random access segment (RAS), frames with temporal ID (0,1) need to be processed twice, once for CNNLF training and once for CNNLF inference, therefore the application of the CNNLF is limited to non-real time encoding only. Thus, it is desirable to further reduce the CNNLF complexity.

As to ALF filtering, there are typically many classes of filters, see Zhang, K. et al., "CE2: Summary report on in-loop filters," JVET-K0022, CE2 coordinators, 2018. Within each class, there are several filters with fixed or trained weights. In operation, first a classification is applied to obtain multiple classes, which gives a partition of a set of all pixel locations. Thereafter, a set of filters is applied for each of those classes. Thus, the performance of ALF not only relies on how filters are configured, but also on how a classification behaves. In VTM 3.0, the following ALF configuration is supported: Classification 4×4, Luma: 5×5 and 7×7, default 7×7, Chroma: 5×5. In some forms, the ALF filter can be considered as a special one-layer CNN with linear activation. However, the number of filter coefficients in an ALF filter is usually too small to capture all relevant features in the video. In order to match different video content, many ALF filters are used. Therefore, ALF makes up the deficiency of the small number of filter coefficients by increasing the number of filter classes used.

To resolve these issues, an adaptive convolutional neural network loop filter (ACNNLF) is disclosed herein and with a significantly reduced complexity and lower computational load such that the ACNNLF can be operated in real time and reduces hardware, memory, and power consumption without sacrificing performance and quality. Particularly, multiple alternative or candidate CNN based loop neural networks or filters are adaptively trained for luma and chroma data from the current video sequence. Each filter may have a small hidden two-layer CNN with a total of 692 parameters which is less than a quarter of the number of parameters compared to the conventional CNNLF. The reduced number of parameters to 692 may include 672 weights plus 20 biases as described below, thereby reducing the processing complexity and memory requirements.

The structure of the ACNNLF also enables real time operation because the training can be performed without using future frames.

An encoder selects from among the multiple ACNNLFs, such as three, for luma and chroma of individual coding tree unit (CTU) blocks (or just CTBs or just blocks herein) to perform encoding. Since the number of ACNNLF filters (such as three) is small, by one example approach it is possible to conduct an exhaustive search for the optimal ACNNLF in the encoding process. Then, the encoder selects the best ACNNLF for each luma and each chroma block from the trained set of multiple ACNNLFs to perform encoding.

The ACNNLF selection then may be indicated in the coded stream to the decoder. The weights of the trained set of ACNNLFs are signaled in the slice header of I-pictures and the index of selected ACNNLF is signaled for each or individual CTBs. The details of the signaling arrangement are described below. A decoder may receive ACNNLF weights (three alternative sets for luma and three alternative sets for chroma for example) and the index of which ACNNLF was selected for encoding and decoding. The decoder then just needs to use the selected ACNNLF to perform the filtering process for each luma and chroma block during frame reconstruction.

Using multiple small CNNs trained at the encoder obtains better performance than one large CNN, as shown by simulation results. The small size CNNs are used at the decoder to reduce complexity and memory requirements there as well. As the number of ACNNLF parameters are reduced, the number of ACNNLFs may be increased to choose from to ensure the ACNNLF configuration can adapt to diverse video content without sacrificing performance.

In comparison, an ALF structure may include one layer, linear activation providing relatively low complexity but with over 100 filter parameters and about 100 filters where only one filter is used at any given block. Likewise, the known CNNLF structure (FIGS. 1 and 1A described herein) has a multi-layer, non-linear activation with only one filter that increases performance but uses over 1000 filter parameters thereby increasing computational load. On the other hand, the disclosed ACNNLF such as that described below uses a two layer, non-linear activation with less than 1000 filter parameters on as few as three filters to provide a significantly low decoder complexity while maintaining very good performance.

A summary of some of the experimental results are as follows. Compared with VTM-3.0-RA (where RA refers to random access), the proposed ACNNLF achieves −2.37%, −1.34%, and −2.77% Bjontegaard-delta rates (or BD-rates) for Y, U, and V, respectively, for Class A1 video sequences; 0.45%, −10.92%, and −6.19% BD-rates for Y, U, and V, respectively, for Class A2 video sequences; −0.49%, −11.29%, and −10.73% BD-rates for Y, U, and V, respectively, for Class B video sequences; and 0.12%, −3.31%, and −1.62% BD-rates for Y, U, and V, respectively, for Class C video sequences. Other details are provided below.

Figure 2A:
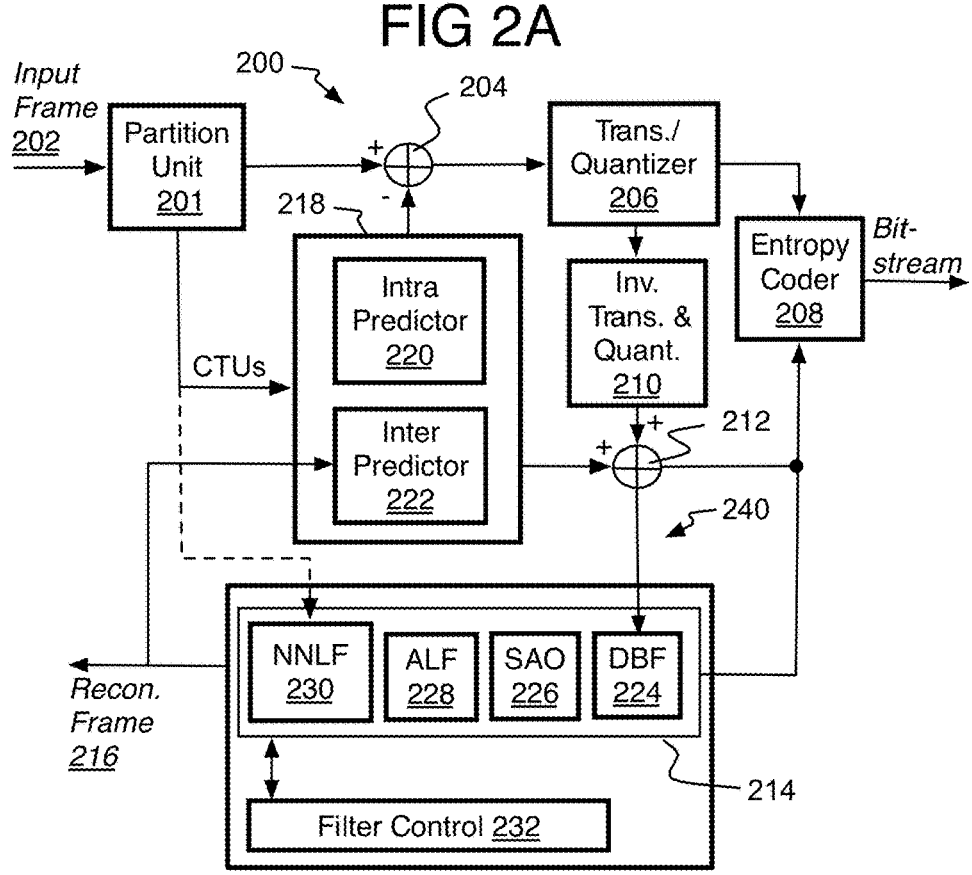
FIG. 2A is a schematic diagram of an encoder according to at least one of the implementations herein.

Referring to FIG. 2A, a video coding system (or image processing system or encoder) 200 is described for better understanding of the implementations of the neural network filtering methods for video coding described herein, and is arranged to perform at least one or more of the implementations described herein. In various implementations, video coding system 200 may be configured to undertake video coding and/or implement video codecs according to one or more standards. Further, in various forms, video coding system 200 may be implemented as part of an image processor, video processor, and/or media processor and undertakes inter-prediction, intra-prediction, predictive coding, and residual prediction. In various implementations, system 200 may undertake video compression and decompression and/or implement video codecs according to one or more standards or specifications, such as, for example, H.264 (MPEG-4), advanced video coding (AVC), VP8, H.265 (High Efficiency Video Coding or HEVC), VP9, Alliance Open Media Version 1 (AV1), and others. Although system 200 and/or other systems, schemes or processes may be described herein, the present disclosure is not necessarily always limited to any particular video encoding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

For the example video coding system 200, the system may be an encoder where current video information in the form of data related to a sequence of video frames may be received for compression. The system 200 may partition each frame into smaller more manageable units, and then compare the frames to compute a prediction. If a difference or residual is determined between an original block and prediction, that resulting residual is transformed and quantized, and then entropy encoded and transmitted in a bitstream out to decoders or storage. To perform these operations, the system 200 may include input pictures 202 (also referred to interchangeably herein as images or frames) that may be re-ordered and partitioned by a partition unit 201 to form coding tree units (CTUs) of original frame data before being provided to a subtraction unit 204 as well as prediction unit 218. The CTUs are also provided to a neural network loop filter unit 230 that performs filtering on a block-by-block basis as described below.

The system 200 also may have a transform and quantizer unit 206 that transforms residuals resulting from the subtractor 204 into coefficients using discrete cosine transform techniques (DCT) or similar techniques, and then quantizes the coefficients to perform lossy compression. The transform and quantization coefficients are then provided to an entropy encoder 208 for lossless compression and transmission.

Figure 2B:
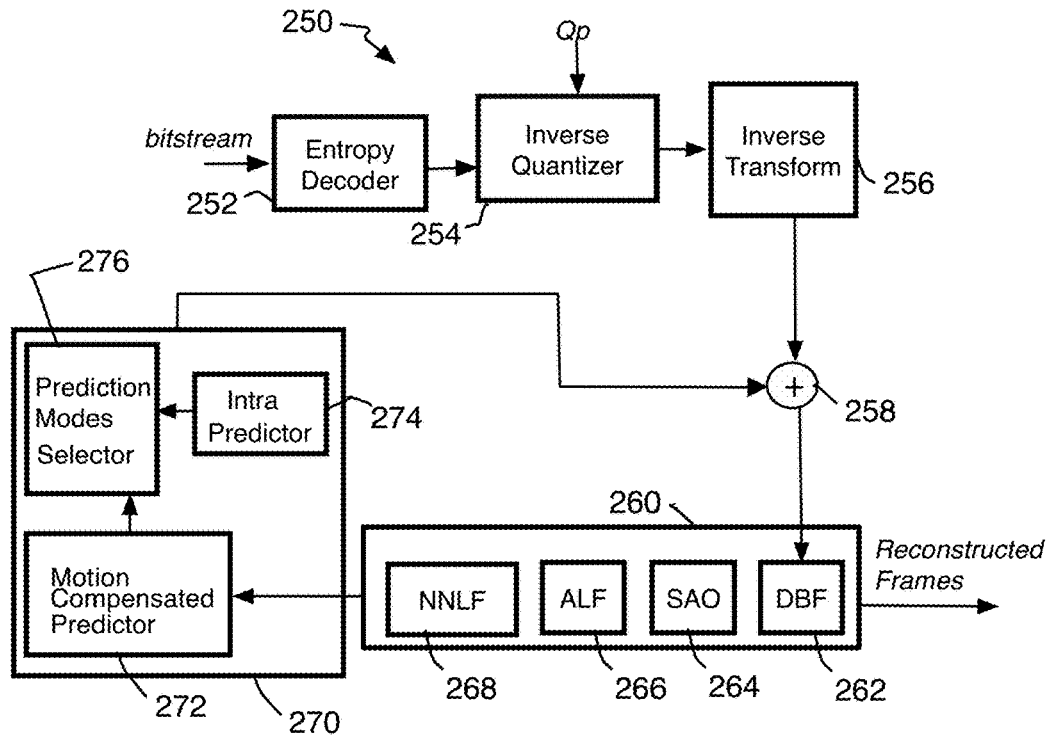
FIG. 2B is a schematic diagram of a decoder according to at least one of the implementations herein.

The output of the quantizer 206 also may be provided to a decoding or prediction loop 240 provided at the encoder to generate the same reference or reconstructed blocks, frames, or other units as would be generated at a decoder 250 (FIG. 2B). Thus, the decoding loop 240 may use inverse quantization and inverse transform unit 210 to reconstruct the frames. Other assemblers such as a residual assembler and prediction unit assembler are not shown on the loop for clarity. An adder 212 and the assemblers are used to reconstruct the units used within each frame.

The decoding loop 240 then provides a filter unit 214 to increase the quality of the reconstructed images to better match the corresponding original frame. This may include a deblocking filter (DBF) 224, a sample adaptive offset (SAO) filter 226, an Adaptive Loop Filter (ALF) 228, and a NN loop filter (NNLF) unit 230 as described above. The NNLF unit 230 provides an ACNNLF described herein to further refine the image data by working as a nonlinear filter. By one form, the neural network-based loop filters are applied to the output of the ALF as shown on filter unit 214.

A filter control 232 also may be provided and performs filter control operations described in detail herein and to refine the image data of a reconstructed frame. By one form, an online training stage of the ACNNLF forms multiple alternative filters. The filter control 232 may test the filters and select the filter among them with the best results. This may include a selection based on bit cost, image quality based on noise for example, and/or other factors. As described below, the filter selection when provided as well as filter coefficients and other filter data may be provided to the entropy encoder 208 to transmit the filter data along with the image data.

The decoding loop 240 also may have a decoded picture buffer (not shown) to hold reference frames 216. Otherwise, the filter unit 214 provides the now reconstructed and refined (by the filters) frames 216 to the prediction unit 218 to be used as reference frames for inter-prediction.

Thus, the encoder 200 also has the prediction unit 218 with an intra-predictor unit 220 and an inter-predictor unit 222 to select prediction modes and form prediction blocks. The prediction blocks are then provided both to the subtraction unit 204 to generate a residual, and in the decoding loop to the adder 212 to add the prediction to the residual from the inverse transform unit 210 to reconstruct a frame. The prediction mode and other prediction data may be provided to the entropy encoder 208 for compression and transmission as well.

In some examples, video coding system 200 may include additional items that have not been shown in FIG. 2A for the sake of clarity. For example, video coding system 200 may include a processor, a radio frequency-type (RF) transceiver, splitter and/or multiplexor, a display, and/or an antenna. Further, video coding system 200 may include additional items such as a speaker, a microphone, an accelerometer, memory, a router, network interface logic, and so forth. Some of these components are shown on other implementations described herein.

Referring to FIG. 2B, a system 250 may have, or may be, a decoder, and may receive coded video data in the form of a bitstream and that has the image data (chroma and luma pixel values) as well as context data including residuals in the form of quantized transform coefficients, prediction data such as motion vectors, identity of reference blocks, and prediction modes for individual blocks, filter coefficients, and filter selection indicating which filter (or neural network or ACNNLF) was actually used when the filter selection is performed at the encoder. The system 250 may process the bitstream with an entropy decoding module 252 to extract chroma and luma pixel data, and the other transmitted data including the filter data. The entropy decoder 252 may use one or more of the methods described below to perform the filtering, and when the filter selection is provided in the bitstream, the decoder may just perform the filtering of the selected filter mode rather than perform the filtering with all of the multiple filters mentioned above.

Once the data is extracted, the system 250 then may use an inverse quantizer module 254 and inverse transform module 256 to reconstruct the residual pixel data. The system 200 then may use assemblers (not shown) and an adder 258 to add the residual to a reconstructed predicted block and to reconstruct an entire frame. The reconstructed frame is then provided to the filter unit 260 that also has a DBF unit 262, SAO unit 264, ALF unit 266, and one or more NNLF units 268, as described with encoder NNLF unit 230 as described herein. The filter unit 200 may perform the filtration in the order just listed or other order as desired and as mentioned for the encoder side. Also as mentioned, when the filter mode selection is provided in the bitstream, only that filter needs to be operated, for example when there is a choice among the multiple ACNNLF filters generated during the online training of the ACNNLFs as described with the encoder 200. The refined frame is then provided to a prediction unit 270.

The prediction unit 270 may decode the resulting data using a decoding prediction technique employed depending on the coding mode indicated in syntax of the bitstream and implemented via prediction mode switch or selector 276. Either a first path was used including an intra prediction module 274 or a second path that is an inter-prediction decoding path including one or more filters of the filter unit 260. The second path may have a decoded picture buffer to store the reconstructed and filtered frames for use as reference frames as well as to send off the reconstructed frames for display or storage for later viewing or another application or device. A motion compensated predictor 272 utilizes reconstructed frames from the filter unit as well as motion vectors from the bitstream to reconstruct a predicted block. The prediction modes selector 276 sets the correct mode for each block as mentioned, where the prediction mode may be extracted and decompressed from the compressed bitstream. The prediction blocks from the prediction unit 270 are then provided to the adder 258. The functionality of modules described herein for systems 200 and 250, except for the filter unit for example and described in detail herein, are well recognized in the art and will not be described in any greater detail herein.

Figure 3:
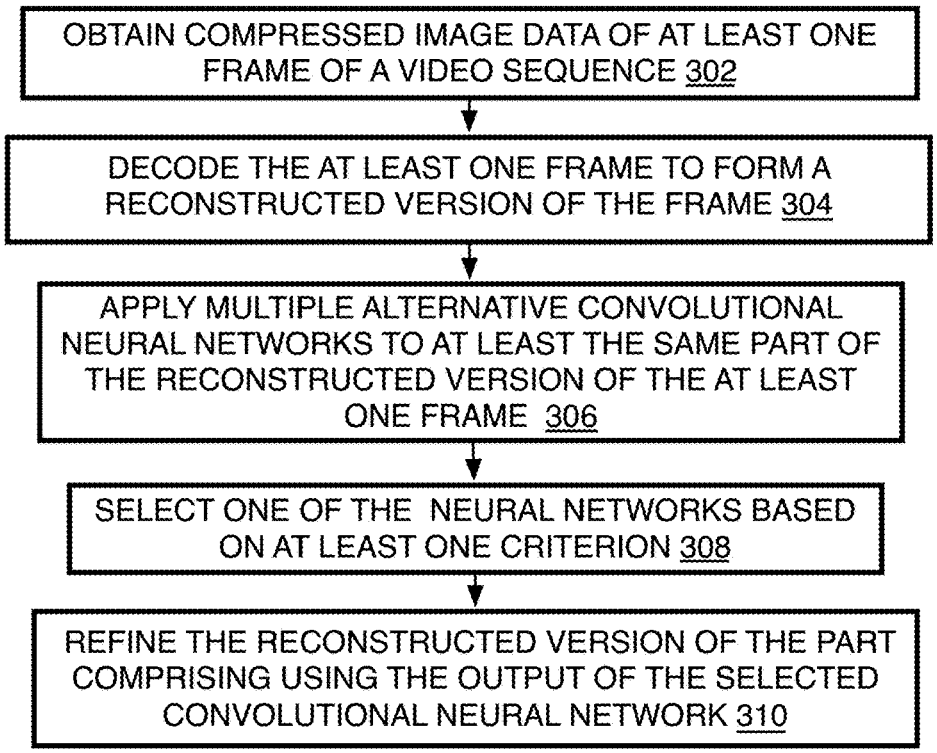
FIG. 3 is a flow chart of a method of neural network loop filtering for video coding according to at least one of the implementations herein.

Referring now to FIG. 3, an example process 300 for neural network loop filtering for video coding is arranged in accordance with at least some implementations of the present disclosure. Process 300 may include one or more operations 302-310, generally numbered evenly, performed, for example, by neural networks 400 or 500, and system 200, 250, or 1000 of FIG. 4, 5, 2A-2B, or 10 respectively, and where relevant.

Process 300 may include "obtain compressed image data of at least one frame of a video sequence" 302. On the encoder, this refers to obtaining compressed data on the decoder loop. On the decoder, this refers to the compressed data received from a transmitted bitstream. In either case, this involves both luma and chroma data (or Y, U, and V) data that is to be input to the neural networks.

Process 300 may include "decode the at least one frame to form a reconstructed version of the frame" 304. Whether at the encoder or the decoder, this refers to reconstructing the frames, and by one example, by inverse transducing and inverse quantization, and so forth until the reconstructed frame is ready for neural network filtering. This may or may not include the operation of the other in-loop filters such as DBF, SAO, and ALF for example. By one form, at least these three filters have been applied, and the ALF filter is providing reconstructed image data of a frame to a neural network, or ACNNLF, filter unit described herein.

Process 300 may include "apply multiple alternative convolutional neural networks to at least the same part of the reconstructed version of at least one frame" 306. As described in detail below, and at the decoding loop of the encoder, multiple convolutional neural networks may be applied to the same region or block of a frame, and the ACNNLF may be applied block by block. By one form, the neural networks each or individually have only two convolutional layers to provide a low complexity neural network that will reduce delay, computational load, hardware requirements, power consumption, and so forth, and which also assists to enable real-time operation. The details of the structure are provided below.

The neural networks may be trained during run-time on a current video sequence being coded. This also may involve input training sets that include image data of already decoded reconstructed frames, which enables real-time or near real-time operation, such as a certain number of consecutive frames before a current frame being decoded or on only i-frames previously decoded. By one example, the image data for the training set may or may not be obtained from the same group of pictures or random access segment. The training is performed by partitioning neural network output into gains, output reconstructed image data that becomes closer to the original data values than the input data, and losses, output reconstructed image data that is farther from the values of the original image data than the input data. By one form, only the loss subset is used to add additional neural networks once two neural networks are formed. The details are provided below.

Process 300 may include "select one of the neural networks based on at least one criterion" 308. At the encoder, this simply involves comparing the output of the alternative neural networks to determine which has the best image data value output to refine the reconstructed frame, and this may be performed on a block by block basis but could be based on other regions such as slices or the entire frame. This also may include a selection based on bit cost, image quality based on noise for example, block level, or other level, differences with original image data of the current reconstructed frame such as by sum of all differences (SAD), mean square error (MSE), structural similarity index measure (SSIM), peak signal-to-noise ration (PSNR), video multi-method assessment fusion (VMAF), and/or other differences or other factors, where many of these comparisons are comparisons to, or using, the original image data.

The encoder also may place at least the selected neural network in the encoded bitstream to be provided to a decoder. By one form, the encoder provides the selected neural network and the identity of the selected neural network so that the decoder can simply use the selected neural network without the need to perform the selection itself. In this case, all alternative neural networks may or may not be provided to the decoder. Otherwise, the decoder may receive all alternative neural networks and the identification of the selected neural network so that the decoder has all NN filter data necessary for any NN selection for any block on a frame.

Process 300 may include "refine the image data of the part comprising using the output of the selected convolutional neural network" 310. By one form, the output of the neural networks are image data values, whether luma or chroma depending on which type of data is being analyzed, and when an alternative neural network (or filter or ACNNLF) is selected, then the output of the neural network or filter replaces the input reconstructed frame or block image data. By another approach, the output of the neural networks could be delta or change values that are to be added to the original data values. The refined image data in the form of reference frames is then provided for inter-prediction at the encoder. In this case, all of operations of process 300 are performed at the encoder. The identification of the selected convolutional neural network as well as the alternative neural networks may be transmitted to the decoder to perform the refining operation as well as described below. In this alternative, the encoder performs the operations of process 300 except for the refining operation 310, which is performed at the decoder.

Referring to FIG. 6A, an example process 600 for neural network loop filtering for video coding is arranged in accordance with at least some implementations of the present disclosure, and as operated by an encoder. Process 600 may include one or more operations 602-624, generally numbered evenly, performed, for example, by neural networks 400 or 500, and system 200, 250, or 1000 of FIG. 4, 5, 2A-2B, or 10 respectively, and where relevant.

Process 600 may include "setup initial neural network structure" 602. This refers to the offline operations are preparing and storing the neural network templates or structure that is to be filled in or trained during run-time, but could be performed offline as well. By one form, to reduce computational load, this may involve "use only two convolutional layers per CNN" 604. The details are as follows.

Referring to FIG. 4, an example structure of a low complexity adaptive neural network loop filter (ACNNLF) 400 for luma (Y) is provided. The ACNNLF 400 has two hidden neural network layers 404 and 406 between an input layer 402 and an output layer 408. Packing and/or unpacking operations are performed at the input and output layers 402 and 408. For packing for luma (Y) subblocks for example to form input layer 402, if one to-be-processed block has a Width×Height, then 2×2 subsampling is applied to generate four stacked subblocks of size Width/2×Height/2 so that each subblock has one of the luma values from each 2×2 sample. Even though the ACNNLF 400 is for luma data, chroma input is used as well as another factor or parameter to increase the accuracy of the output luma data. Thus, two chroma blocks, which are originally a quarter of the size of the corresponding luma block for the same area of a frame, are set to be the same size as the luma subblocks by obtaining a single chroma value from each 2×2 sample. The four luma subblocks and the two chroma subblocks are stacked together to generate six stacked subblocks of size Width/2×Height/2 as the filter input, and are described as six input channels.

At output or unpacking layer 408, the unpacking is performed by using a residual or difference between the output image data from the layer 406 and the input image data of the initial layer 402 as the input to the unpacking neural networks, which is indicated by the arrow and + sign 412. The resulting output is a stack 410 of four luma subblocks described as four output channels, and the output values are luma values that can replace input reconstructed luma data of corresponding pixel locations as described below. Details for the layers are as follows.

For the input layer 402 and the output layer 408, image block (or channel) sizes are N×N pixels. The default for N is 32. N can vary with frame size. For example, a large frame size (such as 2K, 4K, or 1080P) video may use N=32 or 16, while a small frame size video may use N=16 or 8.

For a first CNN layer 1 404, the filter size is L1×L1, where L1 can be 1 or 3 with a default value of 1. A ReLU (Rectified Linear Unit) layer is applied after the first CNN layer 404 as a non-linear activation function, and particularly after each filter. Examples herein use L1=1.

For the second CNN layer 2 406, a filter size is L2×L2, where L2 can be 1, 3, 4, or 5 with a default value of 4. By one form, no ReLU layer is present after the second CNN layer 406, and the outputs may be provided directly to the next layer. In the examples herein 3 is used, while in experiments described below, L2=3 was used.

For output channels of the first CNN layer 404, M is the number of channels, features, or output values, and at a pixel level for a 1×1 filter when L1=1, so that M can vary with frame size with 16 or 42 for a large frame size (such as 2K, 4K, or 1080P), and 8 or 16 for a small frame size. The default is M=16.

The input and inner layers of the ACNNLF 400 is the same for luma and chroma. Thus, ACNNLF 400 would be the same for chroma except that the unpacking or output layer 408 and output stack 410 has two chroma blocks (two channels) rather than four luma blocks. The input for a chroma ACNNLF is still four luma subblocks and two chroma subblocks as described above for the luma ACNNLF. The difference is the training in the neural networks as describe below where the chroma CNNs are trained to output chroma values rather than luma values.

Referring to FIGS. 1A and 5, the conventional structure 100 is in contrast to the disclosed methods that use a filter or network 500 with input 50 and layers 504, 506, 508, and 510 similar to the layers on network 400 except here M=16, L1=1, and L2=3. In contrast to the conventional structure 100 (FIG. 1A), only as few as two hidden convolutional layers 504 and 506 may be used while the known filter 100 uses four convolutional layers 110, 112, 114, and 116. Thus, as shown, the known CNNLF layers are reduced from four to two layers significantly decreasing the complexity of the neural network.

Returning to process 600, an online training technique may be performed for training the ACNNLFs. An initial operation is to "form initial full training dataset" 606. In order to enable run-time or online training, process 600 may include "use data of set of previously decoded frames" 608. Thus, the training data may come directly from video sequences that are to be compressed. This may be accomplished in a number of ways.

Figure 7A:
FIG. 7A is a set of input images for training a loop filter neural network for a first neural network training alternative according to at least one of the implementations herein.
Figure 7B:
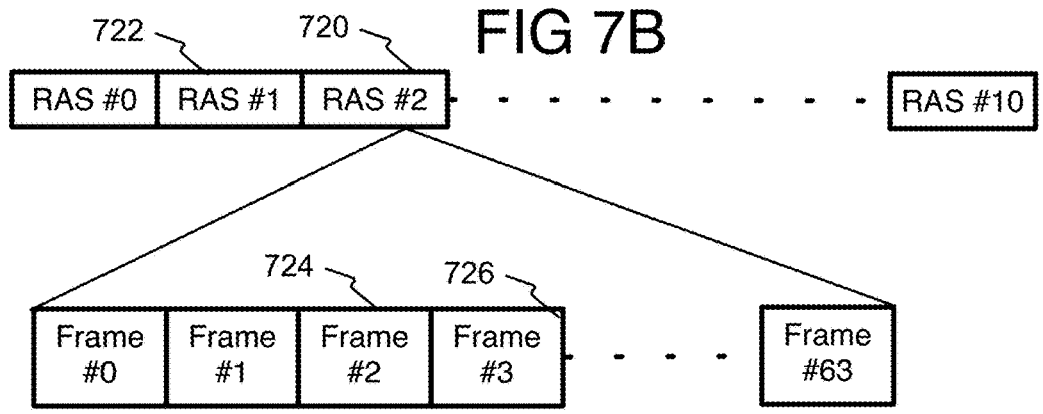
FIG. 7B is a schematic diagram of an example frame sequence for the first neural network training alternative according to at least one of the implementations herein.
Figure 7C:
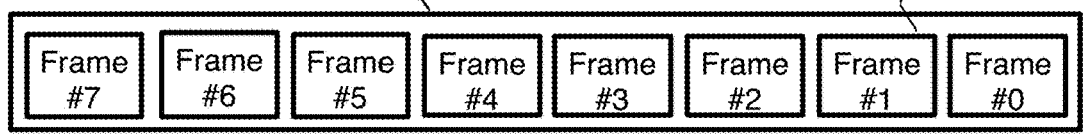
FIG. 7C is another schematic diagram of a frame sequence for the first neural network training alternative according to at least one of the implementations herein.
Figure 8:
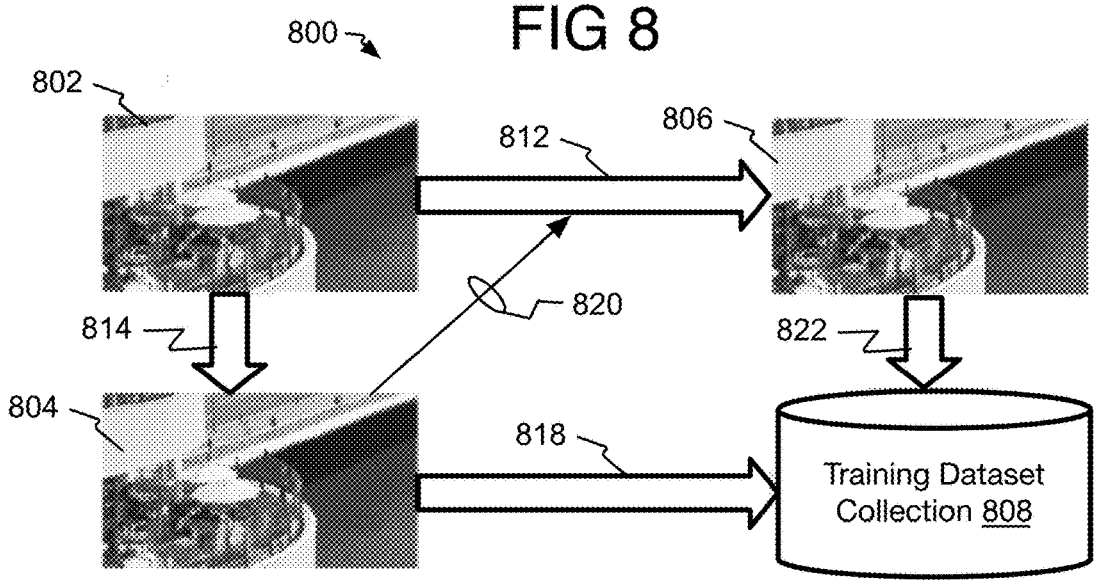
FIG. 8 is a schematic flow diagram of a second neural network training alternative according to at least one of the implementations herein.

Referring to FIGS. 7A-8 for one alternative, this involves the operation "use consecutive frames" 610, and particularly to provide the image data for the initial or full training set (or dataset). In one specific example, the training set 700 (FIG. 7A) may be formed from image data of a video sequence of frames. This training set 700 was used as a class B test set in the experiments mentioned below. The training is done for a sequence of frames 724 of each or individual random access sequence (RAS) or group of pictures (GOP) 1-10 722 shown here on a series 720 (FIG. 7B) of RASs to be compressed, where each RAS has a certain number of frames 726 such as 63 shown here.

In order to form the training set to compress data of a current frame, F frames of video data are used including the current frame and the previous F−1 frames. As shown in FIG. 7C, a total of F frames 750 of data are collected as training data set 750 for RAS data from one or more of the RAS 722 for example including the previous F−1 frames (in encoding order) and the current frame F. In the present example and experiments performed, F=8 was used as shown here on the training frame sequence 750.

By one form, the current frame is in a current RAS, and previous frames F−1 for training are from a previous RAS. In this example, and since the training requires frames from a previous RAS, ACNNLF is disabled for RAS#0. In this case, the training set is not limited to a single RAS or GOP and can overlap with multiple RAS's. By one option, the previous F−1 frames still all must be in the same frame albeit without the current frame. By another approach, the entire training sequence including the current and previous frames remain in the same single RAS or GOP. In any of these options, the sequence 750 of F frames to be used for training for a current frame must be consecutive in encoding order, although other options exist such as intervals by number of frames or by frame type or both.

Referring to FIG. 8, thus, process 600 alternatively may include "build training set depending on I-frames" 612, and for the training. Generally, frames (or pictures or images) of a video sequence may be classified by which mode can be used to reconstruct the frame, and when inter-prediction is being used, which reference frames may be available for such reconstruction. Typically, I-frames do not use inter-prediction, or in other words, reference frames or temporal block matching is not used for I-frames, and I-frames only use intra prediction that uses spatial block matching within the frame itself. This ensures the I-frames will be more accurate at the sacrifice of less compression of the I-frame. Thus, I-frames often form the most important frames of a video sequence such as the first frame of each scene, and are used as reference frames to reconstruct many of the other frames in the video sequence. Here, one I-frame per RAS or GOP may be used. Often, the RAS may have only one RAS but that is not always true. If more than one RAS exists, than the training may be limited to the first I-frame in the RAS, or other such interval. The I-frames are used as reference frames for P-frames that only use previous frames as reference frames and/or B-frames that can use both previous and subsequent frames as reference frames.

In operation, the training process 800 may include obtaining a video sequence 802 of a scene and including an I-frame image of a scene. The process 800 then encodes 814 the I-frame 802 and re-constructs it by using only the intra image data, or in other words, the data on the image itself. The reconstructed frame 804 is designated temporal identification (TID) zero (TID=0) along the video sequence of which it is part. Then, the re-constructed I-frame TID=0 can be used as a reference picture 820 to encode 812 other frames TID=1, 2, 3, and 4 of the video sequence 802 for example. All of the re-constructed pictures are placed 818 and 822 into a database to form part of the training dataset 808.

By this form, the training data will include only the I-frame and a designed number of other frames (such as P-frames and/or B-frames for example) that used the I-frame directly as a reference frame. This could be limited to a single RAS, but otherwise may include more than one I-frame and its dependent frames, and when multiple I-frames are used, the training set may be obtained from frames from more than one RAS. By another option, indirect reference frames could be included as well, where for example, an I-frame may be a reference for a P-frame, and the P-frame may be a reference for a B-frame. In that case, the B-frame could also provide image data for the initial or full training set.

By another option, only I-frames are used for training. The I-frames are obtained from multiple RASs when only one I-frame is provided for each RAS, but otherwise also when there is not enough I-frames in a single RAS to fill the training dataset.

Both training alternatives can support the online training method. The consecutive frame alternative can use the existing data in the encoding process to reduce computational overhead, but may need more memory to save that data. The I-frame alternative can generate the data while the training process is being used and can release that data after training is complete to reduce the memory requirement relative to the consecutive frame option because using consecutive frames is mainly for the purpose of increasing the size of the training data set without impacting real-time performance. The computational overhead for this I-frame alternative, however, is higher than the consecutive frame alternative.

For all or individual training video frames, both the luma and chroma data of original frames and the re-constructed frames (before ACNNLF processing) are collected and formed into a database for the online training process. Each frame is partitioned into small image blocks of size N×N for training of the CNNLFs for compatibility with the CNN structure 400 or 500 for example.

Figure 9A:
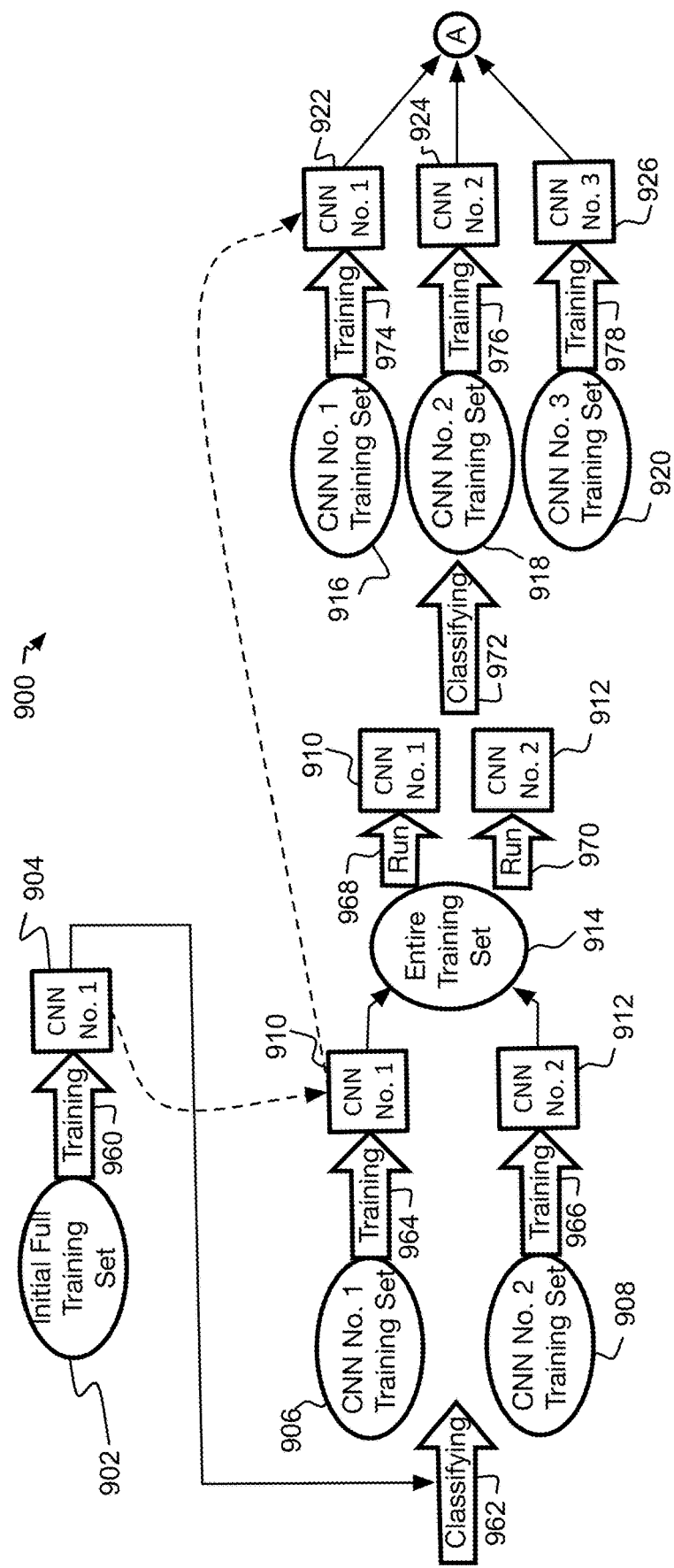

Process 600 may include "train neural network to form multiple alternative neural networks" 614. Referring to FIGS. 9A-9B for the training, a process 900 for training multiple alternative CNNs for neural network loop filtering for video coding is arranged in accordance with at least some implementations of the present disclosure. Process 900 may include one or more operations 960 to 992, generally numbered evenly. The other numbered items on the diagram of process 900 are training sets or data, or neural networks that are used during the process.

Process 900 may start with training 960 one ACNNLF (or an initial neural network or CNN No. 1) 904 by applying the CNN 904 to an initial full training set 902. The CNN 904 has the structure described in NN 400 (FIG. 4), and the initial or full training set 902 is as described above and may include image data of multiple frames as described with operation 606. As mentioned above, and by one form, eight frames worth of reconstructed luma and chroma image data may be used in the initial training set 902, and may have image data of blocks (CTUs) arranged in the six input blocks or channels described above. Going forward, each generation of a column of one or more neural networks on the diagram of process 900 and after a training operation may be considered end of another iteration of the neural networks.

Process 900 then may include classifying 962 the output data from the initial neural network 904. Thus, the first trained ACNNLF 904 may be considered to be part of a classifier since it provides output that can be classified into subsets. The partitioning of the output data from the neural network 904 can be accomplished by using a number of different criteria. By one example, the output data is partitioned or separated into gain blocks and loss blocks. Gain refers to output image data becoming closer in value to original image data of the same pixel location compared to the input reconstructed image data, and loss refers to output image data becoming farther in value from original image data of the same pixel location compared to the input reconstructed image data. The input here between the first and second iterations refers to the data forming the initial full training set 902. The net code rate gain (or just gain) and the net code rate loss (or just loss) may be computed as follows.

$$\begin{cases} \text{If } |O - R_{in}| > |O - R_{out}|, \text{ then net result is a gain} \\ \text{Else net result is a loss} \end{cases} \quad (1)$$

where O may be the representative of a block of original image data, $R_{in}$ may be a representative of a block of reconstructed image data input to the neural network being trained as described herein, and $R_{out}$ may be a representative of a block of reconstructed image data that is the output of the neural network being trained. The representations O, $R_{in}$, and $R_{out}$ may simply be the sum of luma or chroma image data in the designated block or other frame part, but could be an average or other combination of the image data, or single representative such as a minimum or maximum image data value of a single pixel in the block. By another form, each ∥ term is a sum of absolute differences (SAD) of individual corresponding pixel locations in the block, and these two SADs are compared to determine whether a block is a gain block or a loss block. While this is performed on a block-by-block basis, the variables or representations O, $R_{in}$, and $R_{out}$, could represent slices, frames, or other frame parts.

The gain blocks are collected to form a gain set or subset of reconstructed and now refined image data, and the loss blocks are collected to form a loss set or subset of the refined reconstructed image data. Thus, the blocks of reconstructed output image data yielding a net code rate gain are assigned to a gain set CNN No. 1 training set (906), and the blocks of reconstructed output image data yielding a net loss are assigned to a loss set CNN No. 2 training set (908).

Process 900 then may include further training 964 and 966 of the neural network 904 by separately applying the neural network 904 to both the gain subset 906 and the loss subset 908 to generate trained gain neural network (a modified CNN No. 1) 910 and trained loss neural network (a modified CNN No. 2) 912 to complete a second iteration.

Process 900 then may combine the output of the trained gain neural network 910 and trained loss neural network 912 to form a new entire training set 914. The trained gain neural network 910 and trained loss neural network 912 are then applied to, or run with (968 and 970), the entire training set 914. A classifying operation 972 is performed to re-partition or separate the output of both the trained gain neural network 910 and the trained loss neural network 912 into gain blocks and loss blocks again. The latest gain blocks or data of each of the trained neural networks 910 and 912 is kept separate and forms an updated gain subset (CNN No. 1 training set) 974 and (CNN No. 2 training set) 976, while the loss blocks or data from both trained neural networks 910 and 912 is collected into a single loss subset (CNN No. 3 training set) 920.

Thereafter, process 900 may include training 974 and 976 the neural networks 910 and 912 with the gain training sets 974 and 976 respectively, and resulting in trained neural networks (CNN No. 1) and (CNN No. 2) 922 and 924 respectively for a third iteration of these neural networks. A new loss neural network is formed by training a new neural network 926 (without prior iterations) with the latest loss training set 920.

Process 900 may repeat these iterations until a desired number of ACNNLFs are generated and/or the training data is exhausted. The training data is considered exhausted when each training block has at least one trained filter that can yield a gain and no significant loss set is available to train another filter. This may occur when a loss set does not have a sufficient number of training blocks. When the desired number of neural networks is reached but the training data set is not exhausted, then the latest CNN (or ACNNLFs) Nos. 1 (922), 2 (924), and 3 (926) may repeat the classifying and training operations but by partitioning the output data, generated by applying the neural networks to a new entire training set, to the same number of neural networks (here three) as before.

Regardless of the number of iterations and alternative neural networks generated up to this point, process 900 then may include a last iteration or final training loop. In the last iteration, the output data of all of the trained neural networks (or ACNNLFs) 922, 924, and 926 are collected into a single entire training set 928, and the ACNNLFs 922, 924, and 926 are run 980, 982, and 984 with, or applied to, the entire training set 928.

Process 900 then includes classify 986 the output data. Thus, the output of each of the ACNNLFs 922, 924, and 926 is then classified 986 initially into gain and loss training subsets or sets as described above for each ACNNLF. The loss data or loss sets are collected into a single no gain subset 936.

In this stage, however, the gain subset of each filter or neural network (or ACNNLF) 922, 924, 926, is then evaluated against (or run though) all of the other filters 922, 924, or 926 so that each gain subset has been run through each filter 922, 924, and 926. The corresponding neural network 938, 940, and 942, respectively corresponding to filters or neural networks 922, 924, and 926, are assigned to the gain subset associated with the same filter that yielded the highest gain among the gain subsets. Thus, for example, the gain subset output from ACNNLF No. 1 922 is also run through ACNNLFs Nos. 2 and 3. (924 and 926) This is repeated for the other two gain subsets so that each ACNNLF Nos. 1, 2, and 3 each output three different gain subsets. Then, among those three output gain subsets from a single ACNNLF, such as ACNNLF No. 1 922 for example, the ACNNLF No. 1 922 is assigned to its own gain subset with the highest gain, and this highest gain subset is the input for training of the corresponding final ACNNLF NO. 1 938. This is repeated for all of the other filters, and here the filters (or neural networks) 924 and 926. Thus, this partitions the output from the application of the entire training set into four subsets: subset with highest gain for ACNNLF#1 930, subset with highest gain for ACNNLF #2 932, subset with highest gain for ACNNLF#3 934, and as mentioned, subset 936 with no gain for any ACNNLF.

Accordingly, process 900 next may include train 988, 990, and 992 the neural networks (or ACNNLFs) 922, 924, and 926 by applying the ACNNLFs to the highest gain data subset 930, 932, and 934 respectively, which generates final trained alternative neural networks 938, 940, and 942.

Returning to process 600, process 600 may include "apply alternative neural networks for NN filtering at current frame at encoder" 616, and particularly the inference mode can then be performed where the three filters (or other number as formed during the training) are applied to the reconstructed images. By one form, the alternative neural networks receive reconstructed image data already modified by the other three in-loop filters: ALF, SAO filter, and DBF. Also, as mentioned, the neural network filtering may be applied block by block on a frame, and then frame by frame.

Process 600 may include "select alternative neural network for neural network loop filtering depending on output of the alternative neural networks" 618. A filter control then may test the results of the three filters and select the image data with the best result. This may include a selection based on bit cost, image quality based on noise for example, block level differences (or other level differences) with original image data of the current reconstructed frame such as by sum of absolute differences (SAD), mean square error (MSE), structural similarity index measure (SSIM), peak signal-to-noise ratio (PSNR), video multi-method assessment fusion (VMAF), and so forth.

Process 600 may include "provide refined reconstructed frame" 620. Whether at the decoder or encoder, the refined reconstructed frame, or blocks of the frame, are then provided to a prediction unit or reference frame buffer to be used as reference frames. When the decoder is performing the neural network filtering, the reconstructed frames may be placed in memory for further use or provided to a device for display.

Optionally, process 600 may include "transmit at least identification of at least selected neural network to decoder" 622, and so that the decoder may simply use the identified neural network rather than performing a selection operation among the alternative neural networks. This may be performed by using syntax at one or more header of the image data, such as I-slice headers. The syntax is described in detail below.

Also optionally, process 600 may include "transmit at least one of the multiple alternative neural networks to decoder" 624. In this operation, one or all of the alternative neural networks may be transmitted to the decoder which may include the syntax that indicates the neural network structure as well as filter parameters including the weights and biases for the neural network. Some of the details for the syntax of the neural network structure al so is provided below.

The process 600 may be repeated for each of the frames in a video sequence that is to be decoded, and has a sufficient amount of previous frame image data for the training when online or real-time training is desired.

Referring to FIG. 6B, an example process 650 for neural network loop filtering for video coding is arranged in accordance with at least some implementations of the present disclosure, and particularly for a decoder. Process 650 may include one or more operations 652-668, generally numbered evenly, performed, for example, by neural networks 400 or 500, and system 200, 250, or 1000 of FIG. 4, 5, 2A-2B, or 10 respectively, and where relevant.

Process 650 may include "obtain at least one alternative neural network" 652, and this may involve obtaining the structure and data from the bitstream, and by one example from the syntax where applicable. By other forms, the decoder may have a predetermined neural network structure and the bitstream merely provides the data to populate the structure template. This also may include "obtain selected neural network" 654 when the bitstream indicates which neural network is the selected alternative neural network, then only this single neural network might be provided. However, alternatively, no check is made to determine which alternatives where selected for transmission to the decoder, and this operation then may involve "obtain multiple alternative neural networks" 656. By this form, all or multiple alternative neural networks are transmitted and retrieved at the decoder based on the assumption that different ACNNLFs may be selected at different CTUs so that all ACNNLF coefficients should be made available to the decoder.

Accordingly, process 600 optionally may include "obtain identification of at least selected neural network from encoder" 658, and when provided in the bitstream. The identity may be provided in metadata or syntax of data headers, such as an I-slice header for example. The syntax below provides an example for such identification.

Process 600 may include "apply neural network(s) for NN filtering at current reconstructed frame at decoder" 660, and this may be performed differently depending on which alternative neural networks have been received by the decoder and whether the identity of the selected neural network was received as well. Thus, for example, process 600 may include "apply the identified NN" 662 when the identity and data of the selected neural network has been transmitted to the decoder. In this case, once the ACNNLF is applied and the reconstructed data is refined, process 600 may include "provide refined reconstructed frame" 664. The refined reconstructed frame may be provided as a reference frame for motion compensation to complete the decoding of other frames. Also, the refined reconstructed frame may be provided for post-processing if any, such as color space conversion, scaling and so forth, and then provided to memory for further use or to a device for rendering and display. This process may be repeated for each of the blocks in a frame, and each of the frames in a video sequence that is to be decoded.

Syntax Design: ACNNLF Syntax

The parameters of ACNNLF may be signaled in the slice header. By one example, in a random access (RA) configuration, only an I-slice has ACNNLF parameters of the RAS. The multi-level on/off (or enablement) control may be applied at a slice level and CTB level for luma and chroma components. In the slice header, one syntax element (acnnlf_luma_slice_enable_flag and acnnlf_chroma_slice_enable_flag) may be used to indicate ACNNLF enable/disable. At the CTB level, two-bit indicators (or identification codes (IDC)) exist for both luma and chroma, which indicate the ACNNLF is supported in the current CTB, as shown as acnnlf_luma_ctb_idc and acnnlf_chroma_ctb_idc. In the Syntax list below, asterisk [*] indicates either an added syntax or syntax being used for the adaptable CNN loop filter method described herein. Definitions of the syntax terms may be already located within the list but may be recited below the list when not already included. Those syntax with definitions or uses that should be clear from the name of the syntax or are not related to the NN filtering described herein are omitted. One example syntax list is as follows although other syntax structures could be used here instead.

| Sequence Parameter Set (SPS) with Raw Byte Sequence Payload (RBSP) | | |
|---|---|---|
| | | Descriptor |
| seq_parameter_set_rbsp( ) { | | |
|   sps_seq_parameter_set_id | | ue(v) |
|   chroma_format_idc | | ue(v) |
|   if( chroma_format_idc = = 3 ) | | |
|     separate_colour_plane_flag | | u(1) |
|   pic_width_in_luma_samples | | ue(v) |
|   pic_height_in_luma_samples | | ue(v) |
|   bit_depth_luma_minus8 | | ue(v) |
|   bit_depth_chroma_minus8 | | ue(v) |
|   log2_ctu_size_minus2 | | ue(v) |
|   log2_min_qt_size_intra_slices_minus2 | | ue(v) |
|   log2_min_qt_size_inter_slices_minus2 | | ue(v) |
|   max_mtt_hierarchy_depth_inter_slices | | ue(v) |
|   max_mtt_hierarchy_depth_intra_slices | | ue(v) |
|   sps_acnnlf_enable_flag | * | u(1) |
|   if ( sps_acnnlf_enable_flag ){ | * | |
|     log2_acnnblock_width | * | ue(v) |
|   } | | |
|   rbsp_trailing_bits( ) | | |
| } | | | sps_acnnlf_enable_flag indicates whether or not the adaptable neural network is enabled for the entire RAS or group of pictures.

| Slice header syntax | |
|---|---|
| | Descriptor |
| slice_header( ) { | |
|   slice_pic_parameter_set_id | ue(v) |
|   slice_address | u(v) |
|   slice_type | ue(v) |

-continued

| Slice header syntax | | |
|---|---|---|
| | | Descriptor |
| if ( sps_acnnlf_enable_flag ){ | * | |
|    if ( slice_type == I ) { | * | |
|       acnnlf_luma_params_present_flag | * | u(1) |
|       if(acnnlf_luma_params_present_flag){ | * | |
|          acnnlf_luma_coeff ( ) | * | |
|       } | * | |
|       acnnlf_chroma_params_present_flag | * | u(1) |
|       if(acnnlf_chroma_params_present_flag){ | * | |
|          acnnlf_chroma_coeff ( ) | * | |
|       } | * | |
|    } | * | |
|    acnnlf_luma_slice_enable_flag | * | u(1) |
|    acnnlf_chroma_slice_enable_flag | * | u(1) |
| } | * | |
| byte_alignment( ) | | |
| } | | | acnnlf_luma_params_present_flag equal to 1 specifies that acnnlf_luma_coeff ( ) syntax structure will be present. acnnlf_luma_params_present_flag equal to 0 specifies that the acnnlf_luma_coeff ( ) syntax structure will not be present. acnnlf_chroma_params_present_flag equal to 1 specifies that acnnlf_chroma_coeff ( ) syntax structure will be present. acnnlf_chroma_params_present_flag equal to 0 specifies that the acnnlf_chroma_coeff( ) syntax structure will not be present.

| Coding tree unit syntax | | |
|---|---|---|
| | | Descriptor |
| coding_tree_unit( ) { | | |
|   xCtb = ( CtbAddrInRs % PicWidthInCtbsY ) << CtbLog2SizeY | | |
|   yCtb = ( CtbAddrInRs / PicWidthInCtbsY ) << CtbLog2SizeY | | |
|   if(acnnlf_luma_slice_enable_flag ){ | * | |
|     acnnlf_luma_ctb_idc | * | u(2) |
|   } | * | |
|   if(acnnlf_chroma_slice_enable_flag ){ | * | |
|     acnnlf_chroma_ctb_idc | * | u(2) |
|   } | * | |
|   coding_quadtree( xCtb, yCtb, CtbLog2SizeY, 0 ) | | |
| } | | |

| ACNNLF syntax ** | |
|---|---|
| | Descriptor |
| acnnlf_luma_coeff ( ) { | |
|   num_luma_cnnlf | u(3) |
|   num_luma_cnnlf_l1size | tu(v) |
|   num_luma_cnnlf_l1_output_channel | tu(v) |
|   num_luma_cnnlf_l2size | tu(v) |
|   L1_Input = 6, | |
|   L1Size = num_luma_cnnlf_l1size, | |
|   M = num_luma_cnnlf_l1_output_channel, | |
|   L2Size = num_luma_cnnlf_l2size, K = 4 | |
|   for( cnnIdx = 0; cnnIdx < num_luma_cnnlf; cnnIdx ++ ) | |
|     two_layers_cnnlf_coeff(L1_Input, L1Size, M, L2Size, K) | |
| } | |
| acnnlf_chroma_coeff ( ) { | |
|   num_chroma_cnnlf | u(3) |
|   num_chroma_cnnlf_l1size | tu(v) |
|   num_chroma_cnnlf_l1_output_channel | tu(v) |
|   num_chroma_cnnlf_l2size | tu(v) |
|   L1_Input = 6, | |
|   L1Size = num_chroma_cnnlf_l1size, | |

-continued

| ACNNLF syntax ** | |
|---|---|
| | Descriptor |
| ```
M = num_chroma_cnnlf_l1_output_channel,
L2Size = num_chroma_cnnlf_l2size, K = 2
for( cnnIdx = 0; cnnIdx < num_chroma_cnnlf; cnnIdx ++ )
    two_layers_cnnlf_coeff(L1_Input, L1Size, M, L2Size, K)
}
two_layers_cnnlf_coeff(L1_Input, L1Size, M, L2Size, K) {
    for( l1Idx = 0; l1Idx < M; l1Idx++ ) {
        l1_cnn_bias[l1Idx]
    }
    for(l1Idx = 0; l1Idx < M; l1Idx ++ )
        for( inChIdx = 0; inChIdx < L1_Input; inChIdx ++ )
            for( yIdx = 0; yIdx < L1Size; yIdx ++ )
                for( xIdx = 0; xIdx < L1Size; xIdx ++ )
                    cnn_weight[l1Idx][ inChIdx ][ yIdx ][ xIdx]
                }
    for( l2Idx = 0; l2Idx < K; l2Idx++ )
        L2_cnn_bias[l2Idx]
    for(l2Idx = 0; l2Idx < K; l2Idx ++ )
        for( inChIdx = 0; inChIdx < M; inChIdx ++ )
            for( yIdx = 0; yIdx < L2Size; yIdx ++ )
                for( xIdx = 0; xIdx < L2Size; xIdx ++ )
                    cnn_weight[l2Idx][ inChIdx ][ yIdx ][ xIdx]
}
``` | <br><br><br><br><br><br>tu(v)<br><br><br><br><br><br>tu(v)<br><br>tu(v)<br><br><br><br>tu(v) |

Experimental Results

The following sections describe the settings and results for the experiments using VTM 3.0 and other experimental parameters from Li, Y. et al., "Methodology and reporting template for neural network coding tool testing," NET-L1006, 2018.

Training Stage

Online training based on the video sequence itself was performed for each Random Access Segment. The initial I-frame and the previous F−1 frames were used for training, with F=8 used in the experiments. QP values {22, 27, 32, 37} were used. The neural network structure is that of filter 400 or 500 (FIGS. 4-5) described above and where L1=1 and L2=3.

TABLE 1

ACNNLF Training Setup
Information in Training Stage

| | |
|---|---|
| learning rate: | 0.0055 |
| optimizer: | ADAM |
| batch size: | 128 |

TABLE 1-continued

ACNNLF Training Setup
Information in Training Stage

| | |
|---|---|
| epoch: | 148* |
| loss function: | L1 |
| training GPU: | GTX 1080 Ti |
| training time: | 15 minutes* |
| framework: | TensorFlow |

*Measured with A1/A2 video streams, per RAS with training procedure defined in FIG. 2

Inference Stage During Experiments

In an inference stage, the codec uses the model parameters for prediction. At the encoder, all three ACNNLFs are tested to choose the best ACNNLF. At the decoder, only the signaled ACNNLF for each CTB is used to reconstruct the frame. Currently, the ACNNLF inference module is implemented in TensorFlow in 8 bit fixed point. VTM 3.0 encoder and decoder calls the TensorFlow c++ library for inference operations. There will be some additional cost for memory copy and API calling per call. Thus, the VTM-3.0 runtime does not include ACNNLF training time, but does include additional delay calling the TensorFlow inference module.

TABLE 2

ACNNLF Inference Stage Setup

| | Network Details | | | | | | |
|---|---|---|---|---|---|---|---|
| | Total Conv. Layers | Total FC Layers | Framework | Param. Num | GFLOPs | Mem.P (MB) | Mem.T (MB) |
| One ACNNLF | 2 | 0 | TensorFlow module called by VTM3.0 | 692 × 3 (Luma) 402 × 3 (Chroma) | Multip.: 264/pixel Add: 265.5/pixel | 0.0028 | 0.0448 |

Experimental Results

The simulations were performed following JVET common test conditions. See J. Boyce, et al., "JVET common test conditions and software reference configuration," Joint Video Expert Team, JVET-J1010. Only RA video sequences are tested, Table 3 shows the results of the proposed scheme on Random Access for Class A1/A2, B and C.

TABLE 3

Experimental Results of the Proposed Scheme (Random Access)

| | Random Access Main 10 | | | | |
| --- | --- | --- | --- | --- | --- |
| | Y | U | V | EncT | DecT |
| Class A1 | −2.37% | −1.34% | −2.77% | 102% | 529% |
| Class A2 | −0.45% | −10.92% | −6.19% | 99% | 355% |
| Class B | −0.49% | −11.29% | −10.73% | 101% | 384% |
| Class C | 0.12% | −3.31% | −1.62% | 98% | 254% |
| Class E | | | | | |
| Overall | −0.70% | −7.10% | −5.80% | 100% | 361% |

This IDF presents an ACNNLF design with 3 classes of CNN based loop filters, where each filter has only 2 CNN layers and 692 parameters. The 3 ACNNLFs are adaptively trained with video sequence data. The best ACNNLF is selected for luma and chroma respectively for each CTB at an encoder and indicated to a decoder in coded stream with a 2 bit indicator at the CTB level. This is disclosed on the CTU syntax chart above.

Compared with VTM-3.0-RA, the proposed ACNNLF achieves −2.37%, −1.34%, and −2.77% BD-rates for Y, U, and V, respectively, for Class A1 video sequences; −0.45%, −10.92%, and −6.19% BD-rates for Y, U, and V, respectively, for Class A2 video sequences; −0.49%, −11.29%, and −10.73% BD-rates for Y, U, and V, respectively, for Class B video sequences; and 0.12%, −3.31%, and −1.62% BD-rates for Y, U, and V, respectively, for Class C video sequences.

While any implementation of example the processes or systems herein may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
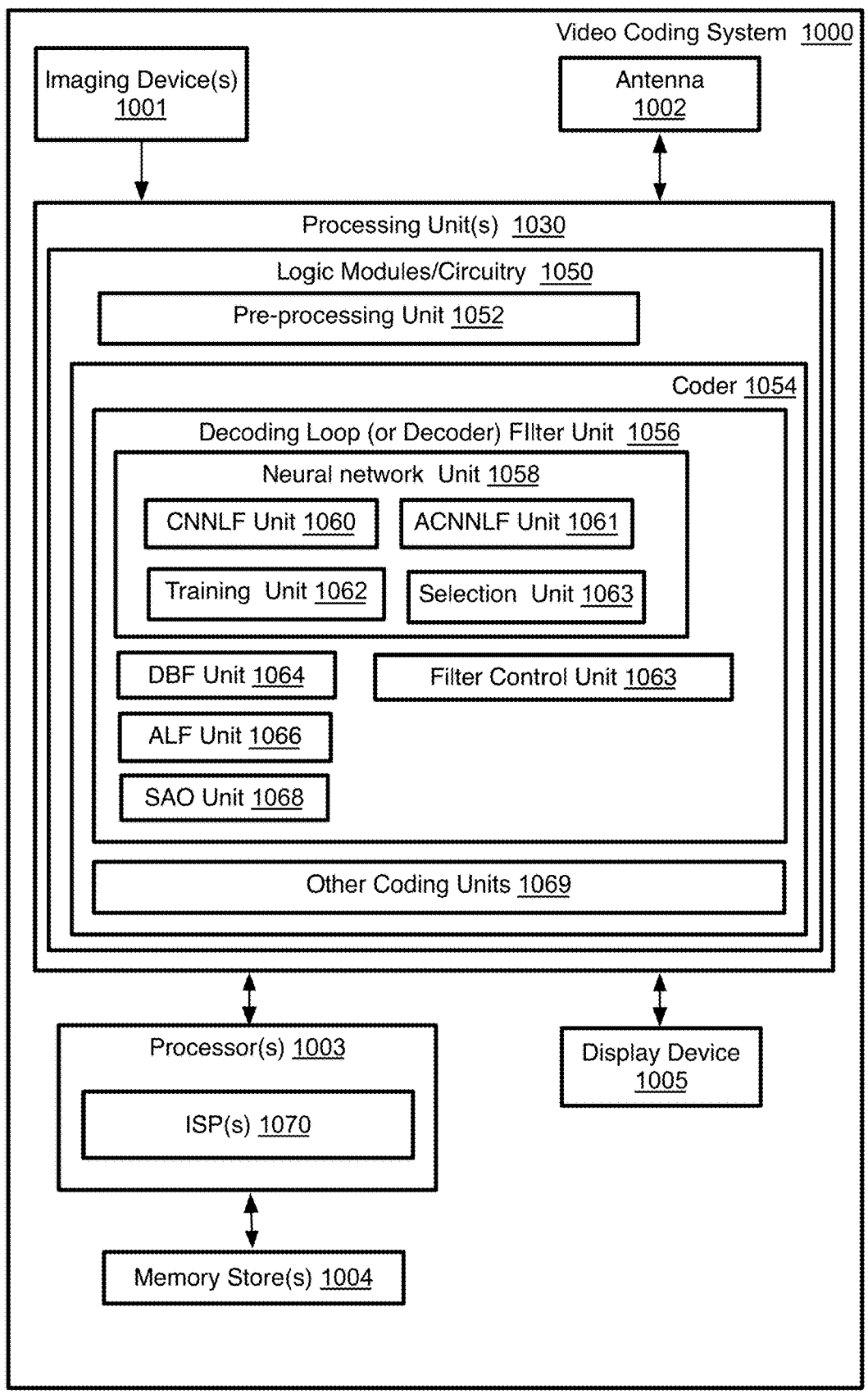
FIG. 10 is an illustrative diagram of an example system.

Referring to FIG. 10, an example image processing system (or video coding system) 1000 for providing neural network loop filters for video coding may be arranged in accordance with at least some implementations of the present disclosure. In the illustrated implementation, system 1000 may include one or more processor(s) 1003, processing unit(s) 1030 to provide the encoder and decoder discussed herein, one or more imaging devices 1001 to capture images, an antenna 1002 to receive or transmit image data, a display device 1005, and one or more memory stores 1004. Processor(s) 1003, memory store 1004, and/or display device 1005 may be capable of communication with one another, via, for example, a bus, wires, or other access. In various implementations, display device 1005 may be integrated in system 1000 or implemented separately from system 1000.

As shown in FIG. 10, and discussed above, the processing unit(s) 1030 may have logic modules or circuitry 1050 with a pre-processing unit 1052 that modifies raw image data for coding, and a coder 1054 that could be encoder 200 or decoder 250, or some combination of these. Relevant here, the coder 1054 may have a decoding loop (decoder) filter unit 1056 that has a neural network unit 1058 with a CNNLF unit 1060 (used when the ACNNLF is not enabled), an ACNNLF unit 1061, a training unit 1062, and a neural network selection (or output) selection unit 1063. The filter unit 1056 also may have a DBF unit 1064, an ALF unit 1066, a SAO unit 1068, and a filter control 1063. The coder 1054 also may have other coding units 1069 which may include video coding units not mentioned yet including any or all of the other units of the encoder 200 or decoder 250 described above for example. All of these perform the tasks as described in detail above and as the title of the unit suggests.

As will be appreciated, the modules illustrated in FIG. 10 may include a variety of software and/or hardware modules and/or modules that may be implemented via software or hardware or combinations thereof. For example, the modules may be implemented as software via processing units 1020 or the modules may be implemented via a dedicated hardware portion. Also, system 1000 may be implemented in a variety of ways. For example, system 1000 (excluding display device 1005) may be implemented as a single chip or device having an accelerator or a graphics processor unit (GPU) which may or may not have image signal processors (ISPs), a quad-core central processing unit, and/or a memory controller input/output (I/O) module. In other examples, system 1000 (again excluding display device 1005) may be implemented as a chipset or a system on a chip (SoC). It will be understood antenna 1002 could be used to receive image data for encoding as well.

Otherwise, processor(s) 1003 may include any suitable implementation including, for example, central processing units (CPUs), microprocessor(s), multicore processors, application specific integrated circuits, chip(s), chipsets, programmable logic devices, graphics cards, integrated graphics, general purpose graphics processing unit(s), fixed function GPUs, SoCs, other accelerators, or the like. This may also include or define a pipeline that has multiple parallel pipeline units that can each process a different large block. The implementation is not limited to perform video coding tasks, and specifically the neural network filters, and that can use software, firmware, and/or hardware including fixed function hardware to efficiently perform the repetitive computations of the neural network filters, or other tasks, and consistent with the description above.

In addition, memory stores 1004 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1004 also may be implemented via cache memory.

In various implementations, the example video coding system 1000 may use the imaging device 1001 to form or receive captured image data. This can be implemented in various ways. Thus, in one form, the image processing system 1000 may be one or more digital cameras or other image capture devices, and imaging device 1001, in this case, may be the camera hardware and camera sensor software, module, or component. In other examples, video coding system 1000 may have an imaging device 1001 that includes or may be one or more cameras, and logic modules 1050 may communicate remotely with, or otherwise may be communicatively coupled to, the imaging device 1001 for further processing of the image data.

Thus, video coding system 1000 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1001 may include camera hardware and optics including one or more sensors as well as auto-focus, zoom, aperture, ND-filter, auto-exposure, flash, and actuator controls. The imaging device 1001 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1001 may be provided with an eye tracking camera. Otherwise, the imaging device 1001 may be any other device that records, displays or processes digital images such as video game panels or consoles, set top boxes, and so forth.

As illustrated, any of these components may be capable of communication with one another and/or communication with portions of logic modules 1050 and/or imaging device 1001. Thus, processors 1003 may be communicatively coupled to both the image device 1001 and the logic modules 1050 for operating those components. Although image processing system 1000, as shown in FIG. 10, may include one particular set of blocks or actions associated with particular components or modules, these blocks or actions may be associated with different components or modules than the particular component or module illustrated here.

Figure 11:
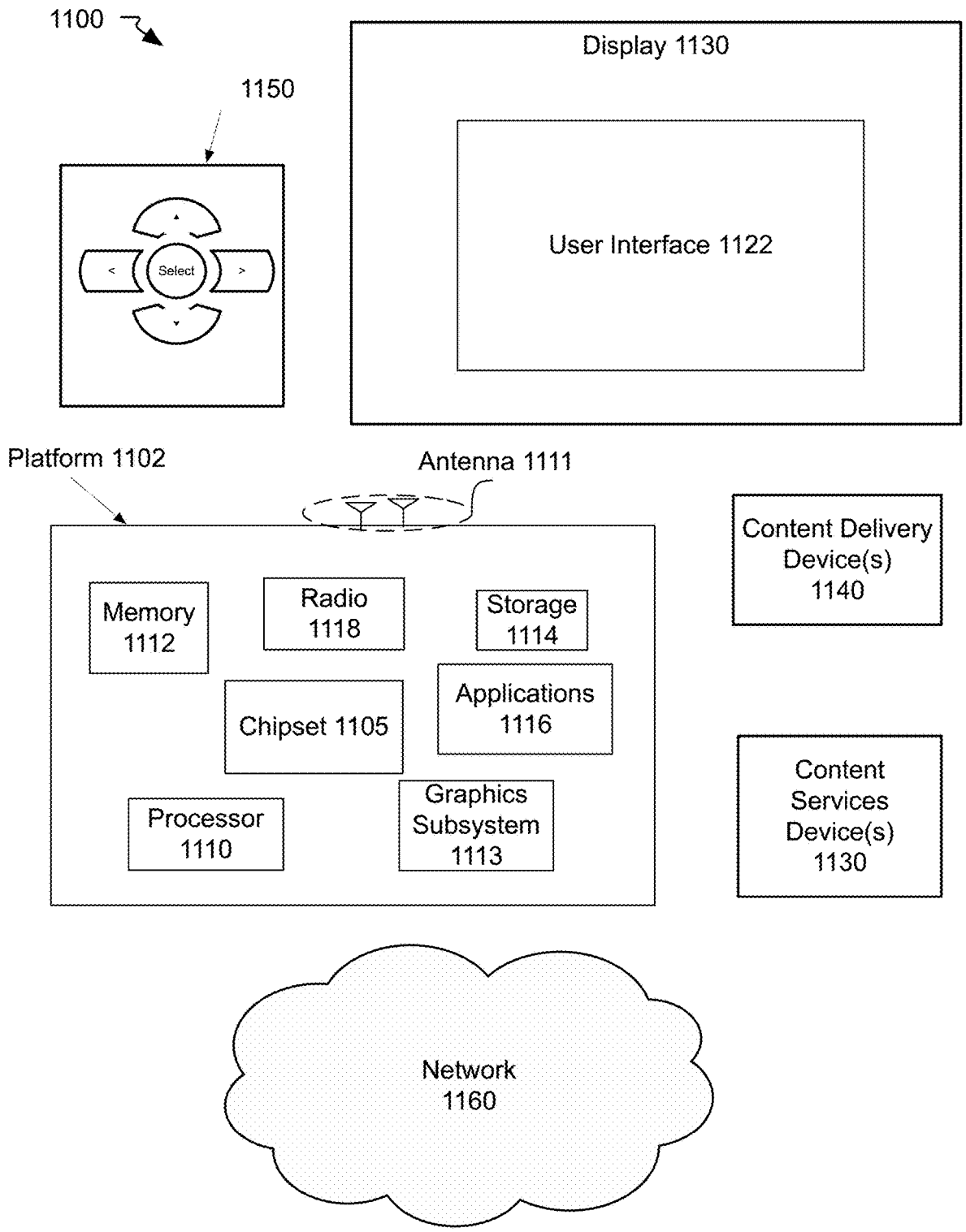
FIG. 11 is an illustrative diagram of another example system.

Referring to FIG. 11, an example system 1100 in accordance with the present disclosure and various implementations may embody system 1100 for example, and may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 communicatively coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118 as well as antenna(s) 1111. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
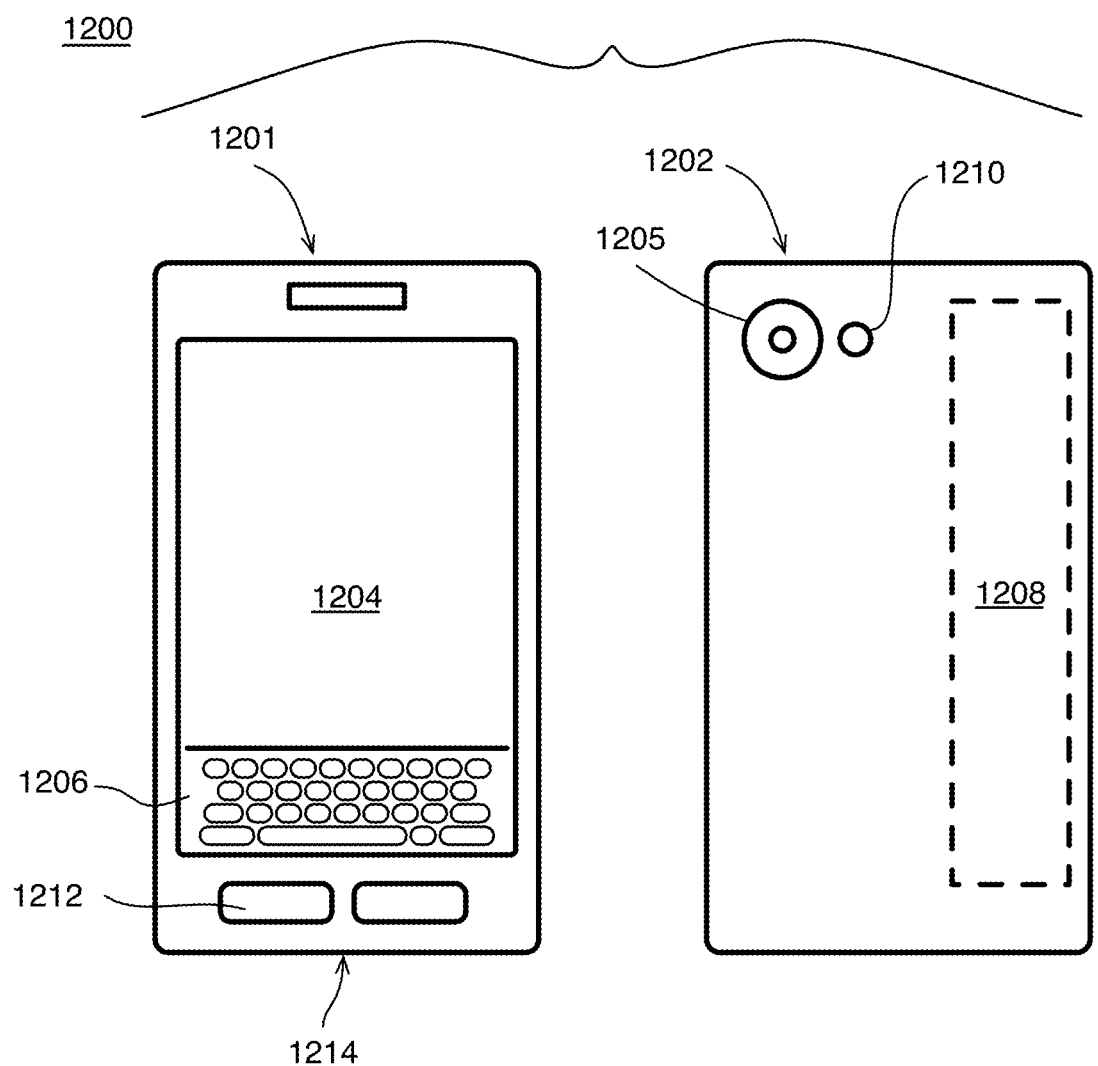
FIG. 12 illustrates an example device, all arranged in accordance with at least some implementations of the present disclosure.

Referring to FIG. 12, and as described above, systems 1000 and 1100 may be embodied in varying physical styles or form factors including a small form factor device 1200, arranged in accordance with at least some implementations of the present disclosure. Thus, in some examples, systems 1000 or 1100 may be implemented via device 1200. In other examples, other devices or systems, or portions thereof may be implemented via device 1200. In various implementations, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212, and one or more microphones 1214. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone 201, or may be digitized by a voice recognition device. As shown, device 1200 may include a camera 1205 (e.g., including a lens, an aperture, and an imaging sensor) and a flash 1210 integrated into back 1202 (or elsewhere) of device 1200.

Various implementations may be implemented using hardware elements, and including those specified above that are implemented as neural network accelerators (NNAs). Otherwise, when not specified, the implementations may be implemented as hardware elements, software elements, or a combination of both. Examples of other hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By an example first implementation, a computer-implemented method of video coding comprises obtaining compressed image data of at least one frame of a video sequence; decoding the at least one frame to form a reconstructed version of the frame; applying multiple alternative convolutional neural networks to at least the same part of the reconstructed version of the at least one frame; selecting one of the convolutional neural networks based on at least one criterion, and refining the image data of the part comprising using the output of the selected convolutional neural network.

Further to the first implementation, the method includes that the multiple alternative convolutional neural networks at least partly establish an adaptable neural network in-loop filter on a decoding loop of an encoder.

Further to the first implementation, the method includes indicating a selection among the alternative convolutional neural networks in syntax data transmitted from an encoder to a remote decoder.

Further to the first implementation, the method includes that the refining occurs at a decoder remote from an encoder and according to a selection indicated by the encoder so that the decoder does not need to perform the selecting.

Further to the first implementation, the method includes that receiving the multiple alternative convolutional neural networks and the identification of the selected convolutional neural networks at a decoder remote from an encoder, and the decoder performing the refining.

Further to the first implementation, the method includes that receiving the multiple alternative convolutional neural networks and the identification of the selected convolutional neural networks at a decoder remote from an encoder, and the decoder performing the refining, and that the method includes the encoder transmits all alternative convolutional neural networks to a decoder without checking which alternative neural networks were selected for a block.

Further to the first implementation, the method includes that the encoder trains the multiple alternative convolutional neural networks before transmitting the multiple alternative convolutional neural networks to the decoder.

Further to the first implementation, the method includes that each of the multiple alternative convolutional neural networks has only two convolutional layers.

Further to the first implementation, the method includes that each of the multiple alternative convolutional neural networks has only two convolutional layers, and that a rectified linear operation is performed on the output of a first layer of the two convolutional layers.

Further to the first implementation, the method includes that the two convolutional layers comprises a first 1×1 filter layer and a second 3×3 filter layer.

Further to the first implementation, the method includes that the selecting is performed during a run-time to complete an encode or decode of the at least one frame comprising forming a dataset to train the convolutional neural networks with image data of a set of previous frames already reconstructed.

Further to the first implementation, the method includes generating and training the multiple alternative convolutional neural networks during a run-time of an encoder and before applying the multiple alternative convolutional neural networks to the reconstructed version of the at least one frame comprising applying an initial neural network to a full training dataset to obtain an output dataset; and partitioning the output dataset by at least one criterion to form separate datasets to train separate neural networks.

In a variation of the first implementation a computer implemented method of video coding comprises obtaining compressed image data of at least one frame of a video sequence; decoding the at least one frame to form a reconstructed version of the frame; and refining the image data of at least one part of the at least one frame comprising (a) receiving identification of a selected alternative convolutional neural network and that was selected among multiple alternative convolutional neural networks at an encoder and applied to at least the same part of the reconstructed version of the at least one frame, and (b) applying the selected convolutional neural network to the at least one part.

By an example second implementation, a computer-implemented system has at least one display; memory to store image data of at least one frame of a video sequence; at least one processor communicatively coupled to the memory and display, and the at least one processor to operate by: obtaining compressed image data of at least one current frame of a video sequence; decoding the at least one current frame to form a reconstructed version of the current frame; during a run-time of an encoder, training multiple alternative convolutional neural networks to output data used to refine image data of the reconstructed version of the frame and comprising establishing an initial training dataset comprising image data of a set of frames decoded previously to the decoding of the current frame; and applying the multiple alternative convolutional neural networks to the reconstructed version of the current frame to refine the image data of the current frame.

Further to the second implementation, the system comprises applying the multiple alternative convolutional neural networks to at least the same part of the reconstructed version of the at least one frame; selecting one of the convolutional neural networks based on at least one criterion, and refining the image data of the part comprising using the output of the selected convolutional neural network.

Further to the second implementation, the system includes that the training dataset comprises data only of one or more I-frames and frames that use the I-frame as a reference frame.

Further to the second implementation, the system includes that the training dataset comprises data only of the same random access segment or group of pictures.

Further to the second implementation, the system includes that the training dataset comprises data of a predetermined number of frames before the current frame regardless of frame location in a particular random access segment and group of pictures.

Further to the second implementation, the system includes that the at least one processor to operate by training the multiple alternative convolutional neural networks before applying the multiple alternative convolutional neural networks to the reconstructed version of the at least one frame comprising applying an initial neural network to a full training dataset to obtain an output dataset; and partitioning the output dataset by at least one criterion to form separate datasets to train separate neural networks.

As an example third implementation, at least one non-transitory computer-readable medium having stored thereon instructions that when executed cause a computing device to operate by: obtaining compressed image data of at least one current frame of a video sequence; decoding the at least one current frame to form a reconstructed version of the current frame; during a run-time of an encoder, training multiple alternative convolutional neural networks to output data used to refine image data of the reconstructed version of the frame and comprising establishing an initial training dataset comprising image data of a set of frames decoded previously to the decoding of the current frame; and applying the multiple alternative convolutional neural networks to the reconstructed version of the current frame to refine the image data of the current frame.

Further to the third implementation, the training comprises applying an initial neural network to the initial training dataset, partitioning the output data of the initial neural network into subsets based on at least one criterion, using at least one of the subsets to train a separate neural network, and repeating the partitioning and using of subsets until a desired number of multiple alternative neural networks is reached.

Further to the third implementation, the training comprises applying an initial neural network to the initial training dataset, partitioning the output data of the initial neural network into subsets based on at least one criterion, using at least one of the subsets to train a separate neural network, and repeating the partitioning and using of subsets until a desired number of multiple alternative neural networks is reached, and the criterion is whether values of the output data indicate a gain versus a loss, wherein gain refers to output image data becoming closer in value to original image data of the same pixel or block location than the input reconstructed image data, and wherein loss refers to output image data becoming farther in value from original image data of the same pixel or block location than the input reconstructed image data.

Further to the third implementation, the training comprises applying an initial neural network to the initial training dataset, partitioning the output data of the initial neural network into subsets based on at least one criterion, using at least one of the subsets to train a separate neural network, and repeating the partitioning and using of subsets until a desired number of multiple alternative neural networks is reached, and the criterion is whether values of the output data indicate a gain versus a loss, wherein gain refers to output image data becoming closer in value to original image data of the same pixel or block location than the input reconstructed image data, and wherein loss refers to output image data becoming farther in value from original image data of the same pixel or block location than the input reconstructed image data, and only a loss-associated subset is used to train a new alternative neural network after two alternative neural networks are trained at least once.

Further to the third implementation, the training comprises applying an initial neural network to the initial training dataset, partitioning the output data of the initial neural network into subsets based on at least one criterion, using at least one of the subsets to train a separate neural network, and repeating the partitioning and using of subsets until a desired number of multiple alternative neural networks is reached, and after three or more neural networks are established, the instructions cause the computing device to operate by training the neural networks on the highest gain output data subset among output subsets from the three or more neural networks resulting from applying the three or more neural networks to the initial training set.

Further to the third implementation, the instructions cause the computing device to operate by applying the multiple alternative convolutional neural networks to at least the same part of the reconstructed version of the at least one frame; selecting one of the convolutional neural networks based on at least one criterion, and refining the image data of the part comprising using the output of the selected convolutional neural network.

Further to the third implementation, the initial training dataset comprises data of a predetermined number of frames before a current frame and not after the current frame being reconstructed and in encoding order.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

The invention claimed is:

1. A computer implemented method of video coding comprising:
   obtaining compressed image data of at least one frame of a video sequence;
   decoding the at least one frame to form a reconstructed version of the frame;
   applying multiple alternative convolutional neural networks to the same pixel locations of the same blocks of the reconstructed version of the at least one frame;
   selecting one of the convolutional neural networks based on at least one criterion, and
   refining the image data of the part comprising using the output of the selected convolutional neural network.

2. The method of claim 1 wherein the multiple alternative convolutional neural networks at least partly establish an adaptable neural network in-loop filter on a decoding loop of an encoder.

3. The method of claim 1 comprising indicating a selection among the alternative convolutional neural networks in syntax data transmitted from an encoder to a remote decoder.

4. The method of claim 1 wherein the refining occurs at a decoder remote from an encoder and according to a selection indicated by the encoder so that the decoder does not need to perform the selecting.

5. The method of claim 1 comprising receiving the multiple alternative convolutional neural networks and the identification of the selected convolutional neural networks at a decoder remote from an encoder, and the decoder performing the refining.

6. The method of claim 5 wherein the encoder transmits all alternative convolutional neural networks to a decoder without checking which alternative neural networks were selected for a block.

7. The method of claim 1 wherein the encoder trains the multiple alternative convolutional neural networks before transmitting the multiple alternative convolutional neural networks to the decoder.

8. The method of claim 1 wherein each of the multiple alternative convolutional neural networks has only two convolutional layers.

9. The method of claim 8 wherein a rectified linear operation is performed on the output of a first layer of the two convolutional layers.

10. The method of claim 8 wherein the two convolutional layers comprises a first 1×1 filter layer and a second 3×3 filter layer.

11. The method of claim 1 wherein the selecting is performed during a run-time to complete an encode or decode of the at least one frame comprising forming a dataset to train the convolutional neural networks with image data of a set of previous frames already reconstructed.

12. The method of claim 1 comprising generating and training the multiple alternative convolutional neural networks during a run-time of an encoder and before applying the multiple alternative convolutional neural networks to the reconstructed version of the at least one frame comprising applying an initial neural network to a full training dataset to obtain an output dataset; and partitioning the output dataset by at least one criterion to form separate datasets to train separate neural networks.

13. A computer-implemented system comprising:
at least one display;
memory to store image data of at least one frame of a video sequence;
at least one processor communicatively coupled to the memory and display, and the at least one processor to operate by:
obtaining compressed image data of at least one current frame of a video sequence;
decoding the at least one current frame to form a reconstructed version of the current frame;
during a run-time of an encoder, training multiple alternative convolutional neural networks to output data used to refine image data of the reconstructed version of the frame and comprising establishing an initial training dataset comprising image data of a set of frames decoded previously to the decoding of the current frame; and
applying the multiple alternative convolutional neural networks to the reconstructed version of the current frame to refine the image data of the current frame.

14. The system of claim 13 comprising:
applying the multiple alternative convolutional neural networks to at least the same part of the reconstructed version of the at least one frame;
selecting one of the convolutional neural networks based on at least one criterion, and
refining the image data of the part comprising using the output of the selected convolutional neural network.

15. The system of claim 13 wherein the training dataset comprises data only of one or more I-frames and frames that use the I-frame as a reference frame.

16. The system of claim 13 wherein the training dataset comprises data only of the same random access segment or group of pictures.

17. The system of claim 13 wherein the training dataset comprises data of a predetermined number of frames before the current frame regardless of frame location in a particular random access segment and group of pictures.

18. The system of claim 13 wherein the at least one processor to operate by training the multiple alternative convolutional neural networks before applying the multiple alternative convolutional neural networks to the reconstructed version of the at least one frame comprising applying an initial neural network to a full training dataset to obtain an output dataset; and partitioning the output dataset by at least one criterion to form separate datasets to train separate neural networks.

19. At least one non-transitory computer-readable medium having stored thereon instructions that when executed cause a computing device to operate by:
obtaining compressed image data of at least one current frame of a video sequence;
decoding the at least one current frame to form a reconstructed version of the current frame;
during a run-time of an encoder, training multiple alternative convolutional neural networks to output data used to refine image data of the reconstructed version of the frame and comprising establishing an initial training dataset comprising image data of a set of frames decoded previously to the decoding of the current frame; and
applying the multiple alternative convolutional neural networks to the reconstructed version of the current frame to refine the image data of the current frame.

20. The medium of claim 19 wherein the training comprises applying an initial neural network to the initial training dataset, partitioning the output data of the initial neural network into subsets based on at least one criterion, using at least one of the subsets to train a separate neural network, and repeating the partitioning and using of subsets until a desired number of multiple alternative neural networks is reached.

21. The medium of claim 20 wherein the criterion is whether values of the output data indicate a gain versus a loss, wherein gain refers to output image data becoming closer in value to original image data of the same pixel or block location than the input reconstructed image data, and wherein loss refers to output image data becoming farther in value from original image data of the same pixel or block location than the input reconstructed image data.

22. The medium of claim 21 wherein only a loss-associated subset is used to train a new alternative neural network after two alternative neural networks are trained at least once.

23. The medium of claim 20 wherein after three or more neural networks are established, the instructions cause the computing device to operate by training the neural networks on the highest gain output data subset among output subsets from the three or more neural networks resulting from applying the three or more neural networks to the initial training dataset.

24. The medium of claim 19 wherein the instructions cause the computing device to operate by applying the multiple alternative convolutional neural networks to at least the same part of the reconstructed version of the at least one frame;

selecting one of the convolutional neural networks based on at least one criterion, and refining the image data of the part comprising using the output of the selected convolutional neural network.

25. The medium of claim 19 wherein the initial training dataset comprises data of a predetermined number of frames before a current frame and not after the current frame being reconstructed and in encoding order.

* * * * *